(12) United States Patent
Chen et al.

(10) Patent No.: US 11,249,281 B2
(45) Date of Patent: Feb. 15, 2022

(54) MICRO IMAGING SYSTEM, IMAGING APPARATUS AND ELECTRONIC DEVICE

(71) Applicant: LARGAN PRECISION CO., LTD., Taichung (TW)

(72) Inventors: Kuan-Ming Chen, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 97 days.

(21) Appl. No.: 16/741,872

(22) Filed: Jan. 14, 2020

(65) Prior Publication Data

US 2020/0150390 A1    May 14, 2020

Related U.S. Application Data

(63) Continuation of application No. 16/254,840, filed on Jan. 23, 2019, now Pat. No. 10,571,655, which is a continuation of application No. 15/455,499, filed on Mar. 10, 2017, now Pat. No. 10,222,583.

(30) Foreign Application Priority Data

Oct. 21, 2016 (TW) .................................. 105134014

(51) Int. Cl.
  *G02B 13/00* (2006.01)
  *G02B 9/12* (2006.01)
  *G02B 5/20* (2006.01)

(52) U.S. Cl.
  CPC ......... *G02B 13/0035* (2013.01); *G02B 5/208* (2013.01); *G02B 9/12* (2013.01)

(58) Field of Classification Search
  CPC ....... G02B 13/0035; G02B 5/208; G02B 9/12
  See application file for complete search history.

(56) References Cited

U.S. PATENT DOCUMENTS

| | | | |
|---|---|---|---|
| 2013/0120859 | A1 | 5/2013 | Tsai et al. |
| 2014/0016212 | A1 | 1/2014 | Kim |
| 2014/0307336 | A1 | 10/2014 | Lai |
| 2015/0138331 | A1 | 5/2015 | Huang |
| 2016/0205297 | A1 | 7/2016 | Chen et al. |
| 2017/0038559 | A1 | 2/2017 | Chen et al. |
| 2019/0049704 | A1 | 2/2019 | Ishii et al. |

FOREIGN PATENT DOCUMENTS

| | | |
|---|---|---|
| CN | 202472103 U | 10/2012 |
| CN | 203299445 U | 11/2013 |
| CN | 205507200 U | 8/2016 |
| JP | 1997288234 | 11/1997 |
| JP | 2000066097 A | 3/2000 |
| JP | 2006201674 A | 8/2006 |
| JP | 2007279547 A | 10/2007 |
| JP | 2007279548 A | 10/2007 |
| JP | 2012098561 A | 5/2012 |
| JP | 2015200906 A | 11/2015 |
| JP | 2016170446 A | 9/2016 |
| JP | 2016218471 A | 12/2016 |
| TW | 201028724 A1 | 8/2010 |

*Primary Examiner* — Jack Dinh
(74) *Attorney, Agent, or Firm* — Locke Lord LLP; Tim Tingkang Xia, Esq.

(57) ABSTRACT

A micro imaging system includes, in order from an object side to an image side: a first lens element having negative refractive power; a second lens element having positive refractive power; and a third lens element with negative refractive power having an object-side surface being concave in a paraxial region thereof. There are a total of three lens elements in the micro imaging system.

26 Claims, 29 Drawing Sheets

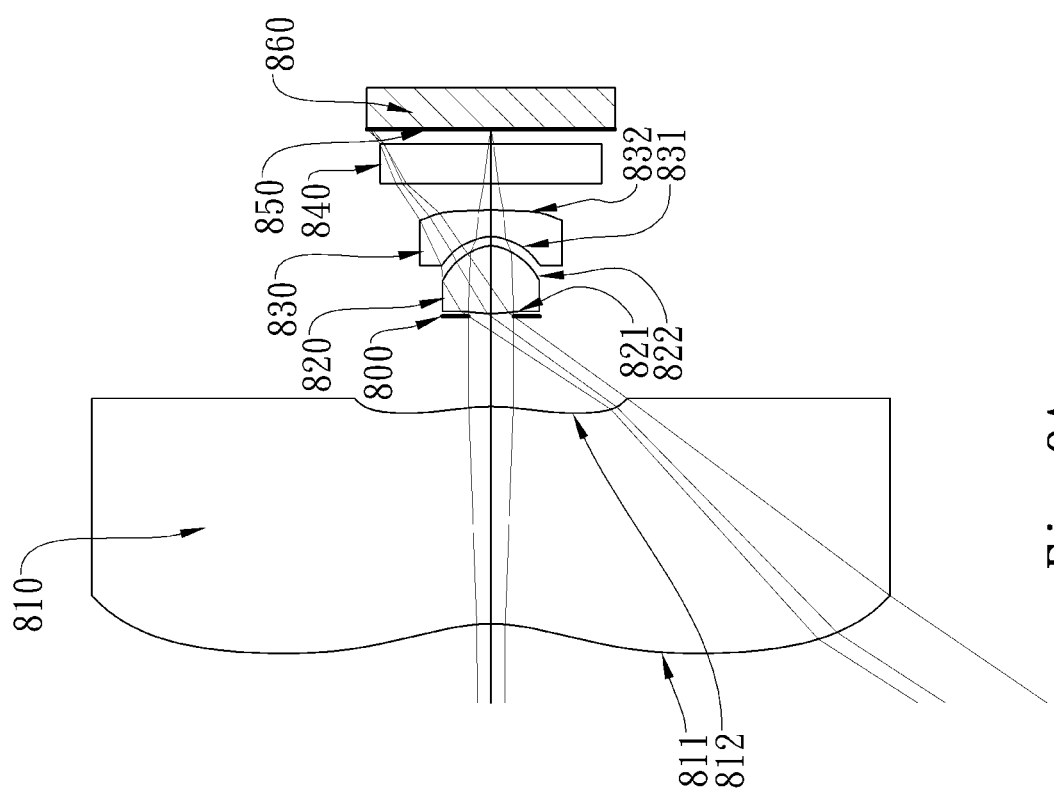

MICRO IMAGING SYSTEM, IMAGING APPARATUS AND ELECTRONIC DEVICE

RELATED APPLICATIONS

This application is a continuation of U.S. application Ser. No. 16/254,840 filed on Jan. 23, 2019, now approved, which is a continuation of U.S. application Ser. No. 15/455,499 filed on Mar. 10, 2017, now patented and claims priority to Taiwan Application Serial Number 105134014, filed on Oct. 21, 2016, which is incorporated by reference herein in its entirety.

BACKGROUND

Technical Field

The present disclosure relates to a micro imaging system and an imaging apparatus, and more particularly, to a micro imaging system and an imaging apparatus applicable to electronic devices.

Description of Related Art

As camera modules being widely utilized, using cameras to fulfill various needs has become a trend of technological developments. In addition, with rapid developments in medical technology, cameras have become essential components to aid physicians in diagnoses and treatments, especially for applications in the precision instruments or in living organism with only limited space which require higher environmental tolerance. Meanwhile, in order to meet various requirements for applications such as intelligent electronics, medical devices, precision instruments, car devices, recognition devices, entertainment devices, sports devices and intelligent home systems, lens assemblies with various features are hence being developed.

Conventional lens assemblies with a wide view angle are usually equipped with spherical glass lenses and this arrangement is difficult in reducing the size of the lens assemblies and achieving the goal of miniaturization. The view angles of the miniaturized imaging systems that are currently available with high image quality are insufficient to capture wider range images. Therefore, the conventional optical lens has failed to adapt to the current trend in the technological development.

SUMMARY

According to one aspect of the present disclosure, a micro imaging system comprising, in order from an object side to an image side: a first lens element having negative refractive power; a second lens element having positive refractive power; and a third lens element with negative refractive power having an object-side surface being concave in a paraxial region thereof, wherein the micro imaging system has a total of three lens elements; a central thickness of the first lens element is CT1, a central thickness of the second lens element is CT2, an axial distance between the first lens element and the second lens element is T12, a focal length of the micro imaging system is f, a curvature radius of the object-side surface of the third lens element is R5, a curvature radius of an image-side surface of the third lens element is R6, and the following conditions are satisfied:

$0.10 < CT2/CT1 < 1.80$;

$0.45 < T12/f < 5.0$;

$|R5/R6| < 0.70$.

According to another aspect of the present disclosure, a micro imaging system comprises, in order from an object side to an image side: a first lens element; a second lens element having positive refractive power; and a third lens element with negative refractive power having an object-side surface being concave in a paraxial region thereof, wherein the micro imaging system has a total of three lens elements; a central thickness of the first lens element is CT1, a central thickness of the second lens element is CT2, a focal length of the first lens element is f1, a focal length of the second lens element is f2, a sum of axial distances between every two adjacent lens elements of the micro imaging system is $\Sigma AT$, a sum of central thicknesses of the first lens element, the second lens element, and the third lens element is $\Sigma CT$, and the following conditions are satisfied:

$0.10 < CT2/CT1 < 1.10$;

$-1.30 < f2/f1 < 0.10$;

$0.20 < \Sigma AT/\Sigma CT < 0.95$

According to another aspect of the present disclosure, a micro imaging system comprising, in order from an object side to an image side: a first lens element; a second lens element having positive refractive power; and a third lens element having negative refractive power; wherein the micro imaging system has a total of three lens elements; a central thickness of the first lens element is CT1, a central thickness of the second lens element is CT2, an axial distance between the first lens element and the second lens element is T12, an axial distance between an object-side surface of the first lens element and an image surface is TL, a focal length of the micro imaging system is f, a curvature radius of an object-side surface of the second lens element is R3, a curvature radius of an image-side surface of the second lens element is R4, and the following conditions are satisfied:

$0.10 < CT2/CT1 < 2.50$;

$0.10 < T12/CT1 < 3.80$;

$3.80 < TL/f < 10.0$;

$0 < (R3-R4)/(R3+R4) < 3.0$.

According to another aspect of the present disclosure, an imaging apparatus includes the aforementioned micro imaging system and an image sensor disposed on an image surface of the micro imaging system.

According to yet another aspect of the present disclosure, an electronic device includes the aforementioned imaging apparatus.

BRIEF DESCRIPTION OF THE DRAWINGS

FIG. 8A is a schematic view of an imaging apparatus according to the 8th embodiment of the present disclosure;

DETAILED DESCRIPTION

Figure 1A:
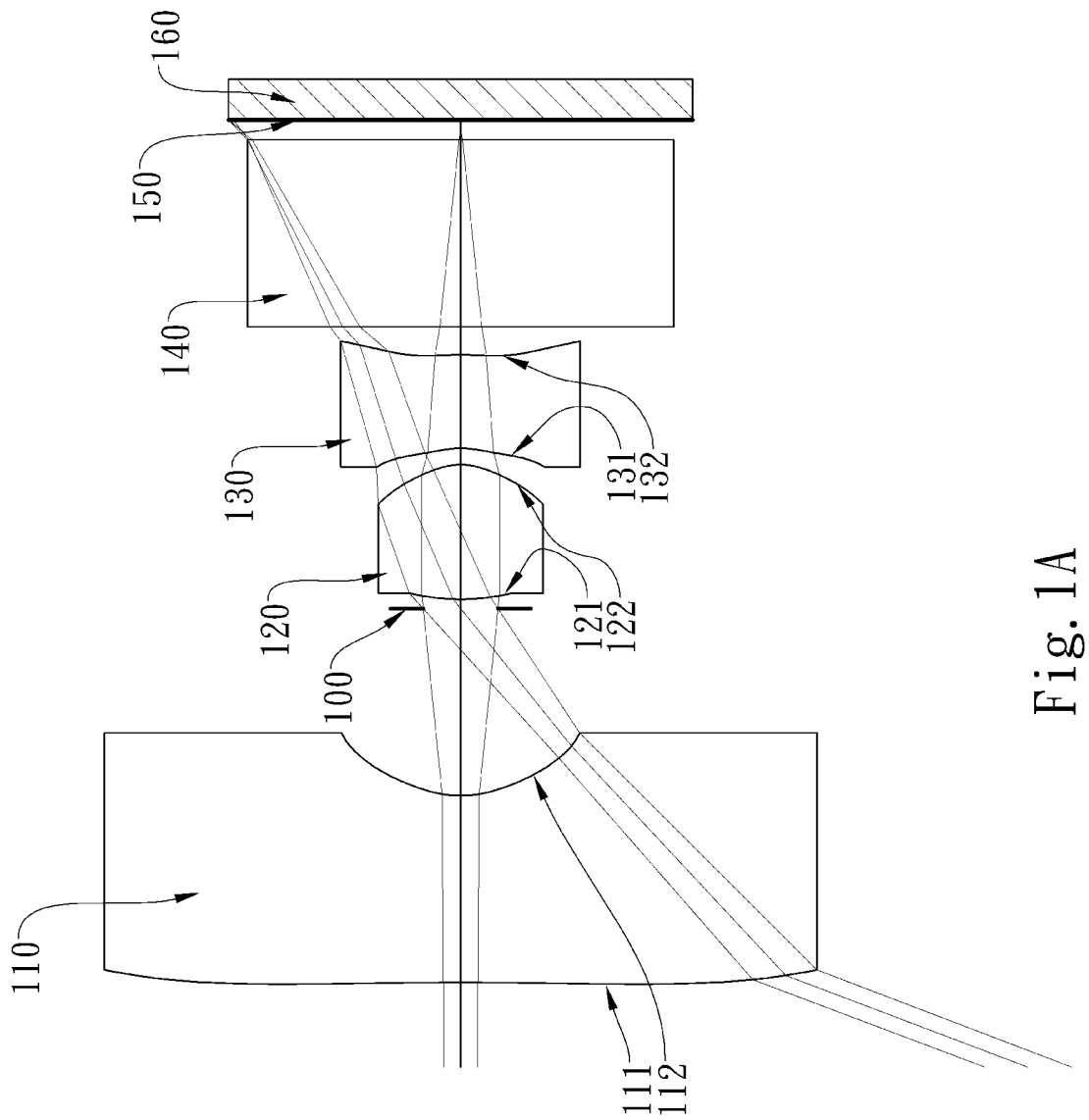
FIG. 1A is a schematic view of an imaging apparatus according to the 1st embodiment of the present disclosure.

The present disclosure provides a micro imaging system including, in order from an object side to an image side, a first lens element, a second lens element, and a third lens element.

The first lens element may have negative refractive power so as to favorably form a retro-focus structure to provide an image capturing range with a wider angle of view. The first lens element may have an image-side surface being concave in a paraxial region thereof such that the first lens element may have sufficient diverging power to favorably achieve a wide angle feature.

The second lens element has positive refractive power to provide the micro imaging system with a major portion of its converging power so as to balance aberrations caused by the first lens element and satisfy the needs for miniaturization and a wide angle of view. The second lens element may have an object-side surface being convex in a paraxial region thereof such that the curvatures of the second lens element can be effectively arranged to avoid excessive aberrations caused by the overly large curvature. The second lens element may have an image-side surface being convex in a paraxial region so as to enhance the convergent ability of the micro imaging system and properly allocate the position of the principal point to achieve better imaging performance.

The third lens element has negative refractive power so as to favorably control the back focal length of the micro imaging system to avoid an overcorrection of Petzval field. The third lens element may have both an object-side surface and an image-side surface being aspheric. The object-side surface may be concave in a paraxial region thereof to adjust the incident angle of light on the surface to reduce the probability of total reflections. The third lens element may have the image-side surface being convex in a paraxial region thereof to control the incident angle of light on the image surface so as to have a sufficiently large light retrieving area. The third lens element may have at least one concave shape between the paraxial region and an off-axial region of the image-side surface thereof so as to favorably correct Petzval field to improve image quality in the off-axial region.

The micro imaging system has a total of three lens elements; at least one surface of the first lens element, the second lens element and the third lens element has at least one inflection point thereon so as to effectively control the shape of the lens element in an off-axial region and adjust the angle between the lens element and the light to avoid stray light.

When a central thickness of the first lens element is CT1, a central thickness of the second lens element is CT2, and the following condition is satisfied: $0.10 < CT2/CT1 < 2.50$, the structural properties can be strengthened and the resistance to stress can be improved to avoid deformation of lens elements caused by external forces or environmental factors so as to obtain better adaptability to the environment for various application. Preferably, the following condition can be satisfied: $0.10 < CT2/CT1 < 1.80$. Preferably, the following condition can be satisfied: $0.10 < CT2/CT1 < 1.10$.

When an axial distance between the first lens element and the second lens element is T12, a focal length of the micro imaging system is f, and the following condition is satisfied: $0.45 < T12/f < 5.0$, the distance between the first lens element and the second lens element can be effectively controlled to avoid a waste of space from overly large spacing or reduction of the view angle from overly small spacing. Preferably, the following condition can be satisfied: $0.60 < T12/f < 3.5$.

When a curvature radius of the object-side surface of the third lens element is R5, a curvature radius of the image-side surface of the third lens element is R6, and the following condition is satisfied: $|R5/R6| < 0.70$, the curvature of the third lens element can be properly arranged so as to obtain an effective balance between the view angle and the total track length. Preferably, the following condition can be satisfied: $|R5/R6|<0.50$.

When a focal length of the first lens element is f1, a focal length of the second lens element is f2, and the following condition is satisfied: $-1.30<f2/f1<0.10$, the distribution of the refractive power of the lens elements can be effectively balanced so as to obtain the features of a wide view angle and miniaturization. Preferably, the following condition can be satisfied: $-0.75<f2/f1<0$.

When a sum of axial distances between every two adjacent lens elements of the micro imaging system is ΣAT, a sum of central thicknesses of the first lens element, the second lens element, and the third lens element is ΣCT, and the following condition is satisfied: $0.20<\Sigma AT/\Sigma CT<0.95$, the space of the micro imaging system can be effectively utilized to meet the requirement of miniaturization.

When the axial distance between the first lens element and the second lens element is T12, the central thickness of the first lens element is CT1, and the following condition is satisfied: $0.10<T12/CT1<3.80$, the space utilization of the micro imaging system can be improved to achieve minimization. Preferably, the following condition can be satisfied: $0.30<T12/CT1<2.50$.

When an axial distance between an object-side surface of the first lens element and an image surface is TL, the focal length of the micro imaging system is f, and the following condition is satisfied: $3.80<TL/f<10.0$, it is favorable for the micro imaging system to form the feature of a wide angle of view and reduce the axial deviations of light with different wavelengths due to shifts from the optical axis.

When a curvature radius of the object-side surface of the second lens element is R3, a curvature radius of the image-side surface of the second lens element is R4, and the following condition is satisfied: $0<(R3-R4)/(R3+R4)<3.0$, the geometry of the second lens element can be effectively controlled and the position of the principal point is more favorable to form a wide view angle system. Preferably, the following condition can be satisfied: $1.50<(R3-R4)/(R3+R4)<2.50$.

When an Abbe number of the second lens element is V2, an Abbe number of the third lens element is V3, and the following condition is satisfied: $2.0<V2/V3<4.0$, aberrations of the micro imaging system can be corrected so as to favor the convergence of light with different wavelengths on the same image surface.

When the axial distance between the first lens element and the second lens element is T12, an axial distance between the second lens element and the third lens element is T23, the central thickness of the first lens element is CT1, and the following condition is satisfied: $0.10<(T12+T23)/CT1<2.15$, the lens spacing can be balanced so as to avoid interference between the lens elements due to the small spacing or increased stray light due to the large spacing. Preferably, the following condition can be satisfied: $0.20<(T12+T23)/CT1<1.85$. Preferably, the following condition can be satisfied: $0.30<(T12+T23)/CT1<1.50$.

When the curvature radius of the image-side surface of the second lens element is R4, the central thickness of the second lens element is CT2, and the following condition is satisfied: $-0.50<R4/CT2<0$ degrees, the refractive power of the second lens element can be strengthened such that the micro imaging system can control the total track length with sufficient convergent ability.

When the focal length of the micro imaging system is f, the focal length of the second lens element is f2, and the following condition is satisfied: $0<f/f2<2.0$, the main refractive power of the micro imaging system can be balanced while ensuring a sufficient field of view.

When the curvature radius of the image-side surface of the second lens element is R4, the curvature radius of the object-side surface of the third lens element is R5, and the following condition is satisfied: $-100<(R4+R5)/(R4-R5)<-5.0$, the spatial relationship between the second lens element and the third lens element can be balanced such that high manufacturability can be satisfied with an excellent aberration correcting ability.

When a maximum image height of the micro imaging system is ImgH, the focal length of the micro imaging system is f, and the following condition is satisfied: $0.95<ImgH/f<3.0$, the light retrieving area of the micro imaging system and the image brightness can be increased while improving the symmetry of the micro imaging system to correct aberrations.

The micro imaging system may further comprise an aperture stop between the first lens element and the second lens element. When an axial distance between the aperture stop and the image-side surface of the third lens element is SD, an axial distance between an object-side surface of the first lens element and the image-side surface of the third lens element is TD, and the following condition is satisfied: $0.10<SD/TD<0.50$, the total track length of the micro imaging system can be controlled while having an image capturing range with a large view angle.

Figure 12:
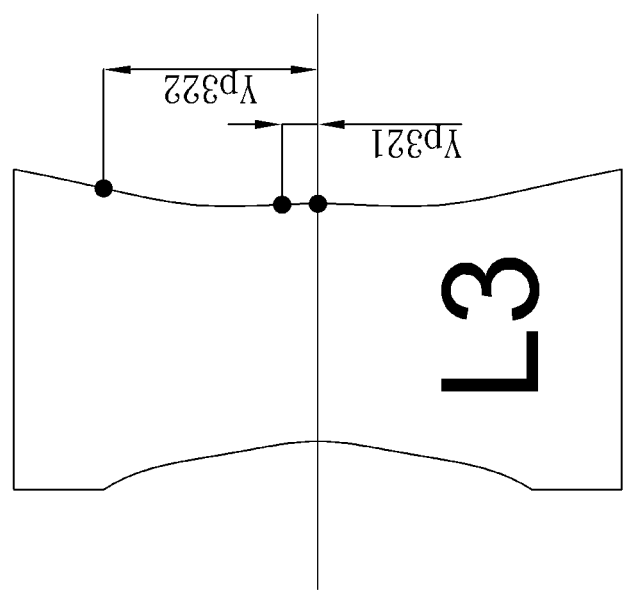
FIG. 12 is a schematic view showing distances represented by the parameters Yp32 of a micro imaging system of the present disclosure.

When a vertical distance between an inflection point on the image-side surface of the third lens element and an optical axis is Yp32 (Please refer to FIG. 12, if there is a plurality of inflection points, Yp32 can be one of the vertical distances between an inflection point on the image-side surface of the third lens element and an optical axis is Yp321 or Yp322), the focal length of the micro imaging system is f, and the following condition is satisfied: $0<Yp32/f<1.50$, the aberrations in an off-axial region of the micro imaging system can be corrected so as to effectively reduce coma aberrations and distortions.

When a focal length of the third lens element is f3, the focal length of the first lens element is f1, and the following condition is satisfied: $0.1<f3/f1<0.95$, the functionality of the third lens element can be improved for aberration corrections.

According to the micro imaging system of the present disclosure, the lens elements thereof can be made of glass or plastic material. When the lens elements are made of glass material, the distribution of the refractive power of the micro imaging system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the micro imaging system can be effectively reduced.

According to the micro imaging system of the present disclosure, the micro imaging system can include at least one stop, such as an aperture stop, a glare stop or a field stop, so as to favorably reduce the amount of stray light and thereby improving the image quality.

According to the micro imaging system of the present disclosure, an aperture stop can be configured as a front stop or a middle stop. A front stop disposed between an imaged object and the first lens element can provide a longer distance between the exit pupil and the image surface so that there is a telecentric effect for improving the image-sensing efficiency of an image sensor, such as a CCD or CMOS sensor. A middle stop disposed between the first lens element and the image surface is favorable for enlarging the field of view, thereby providing the micro imaging system with the advantage of a wide-angle lens.

According to the micro imaging system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the micro imaging system of the present disclosure, the image surface of the micro imaging system, based on the corresponding image sensor, can be a plane or a curved surface with an arbitrary curvature, especially a curved surface being concave facing towards the object side.

The micro imaging system of the present disclosure can be optionally applied to moving focus optical systems. According to the micro imaging system of the present disclosure, the micro imaging system features a good aberration correction capability and high image quality, and can be applied to electronic devices such as smart electronics, medical devices, precision instruments, car devices, recognition devices, entertainment devices, sports devices and smart home systems.

According to the present disclosure, an imaging apparatus includes the aforementioned micro imaging system and an image sensor, wherein the image sensor is disposed on or near an image surface of the micro imaging system. Therefore, the design of the micro imaging system enables the imaging apparatus to achieve high image quality. Preferably, the micro imaging system can further include a barrel member, a holder member or a combination thereof. In addition, the imaging apparatus can further include an optical image stabilizer (OIS) to enhance the micro imaging system with even better imaging quality.

Figure 13A:
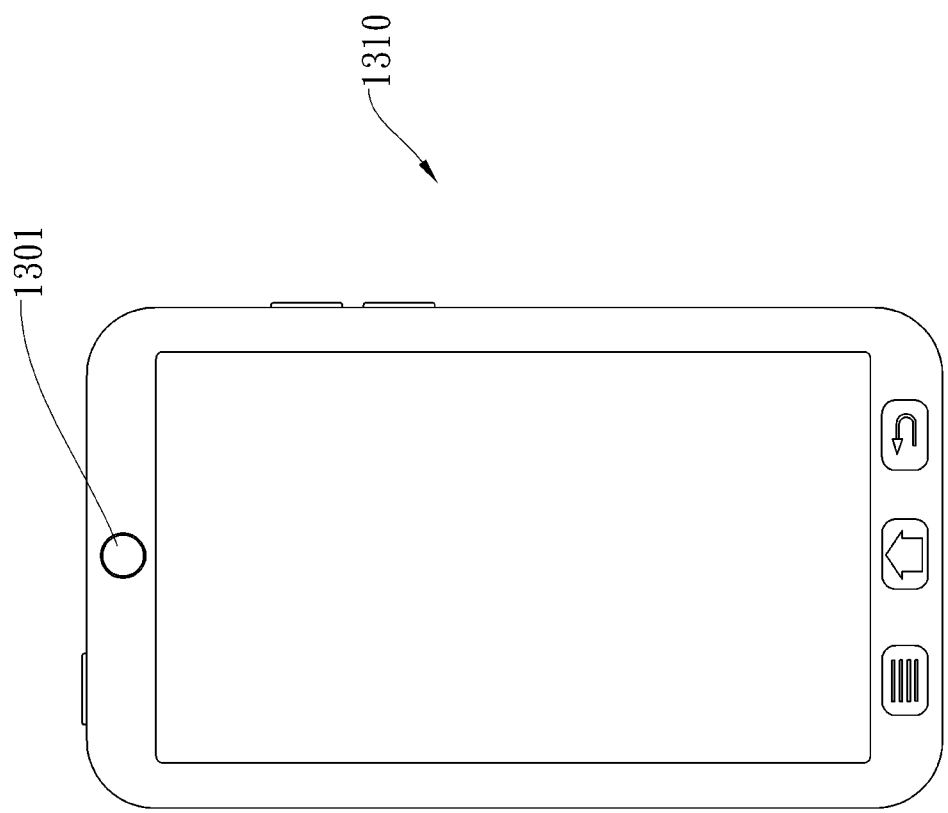
FIG. 13A shows a smartphone with an imaging apparatus of the present disclosure installed therein.
Figure 13B:
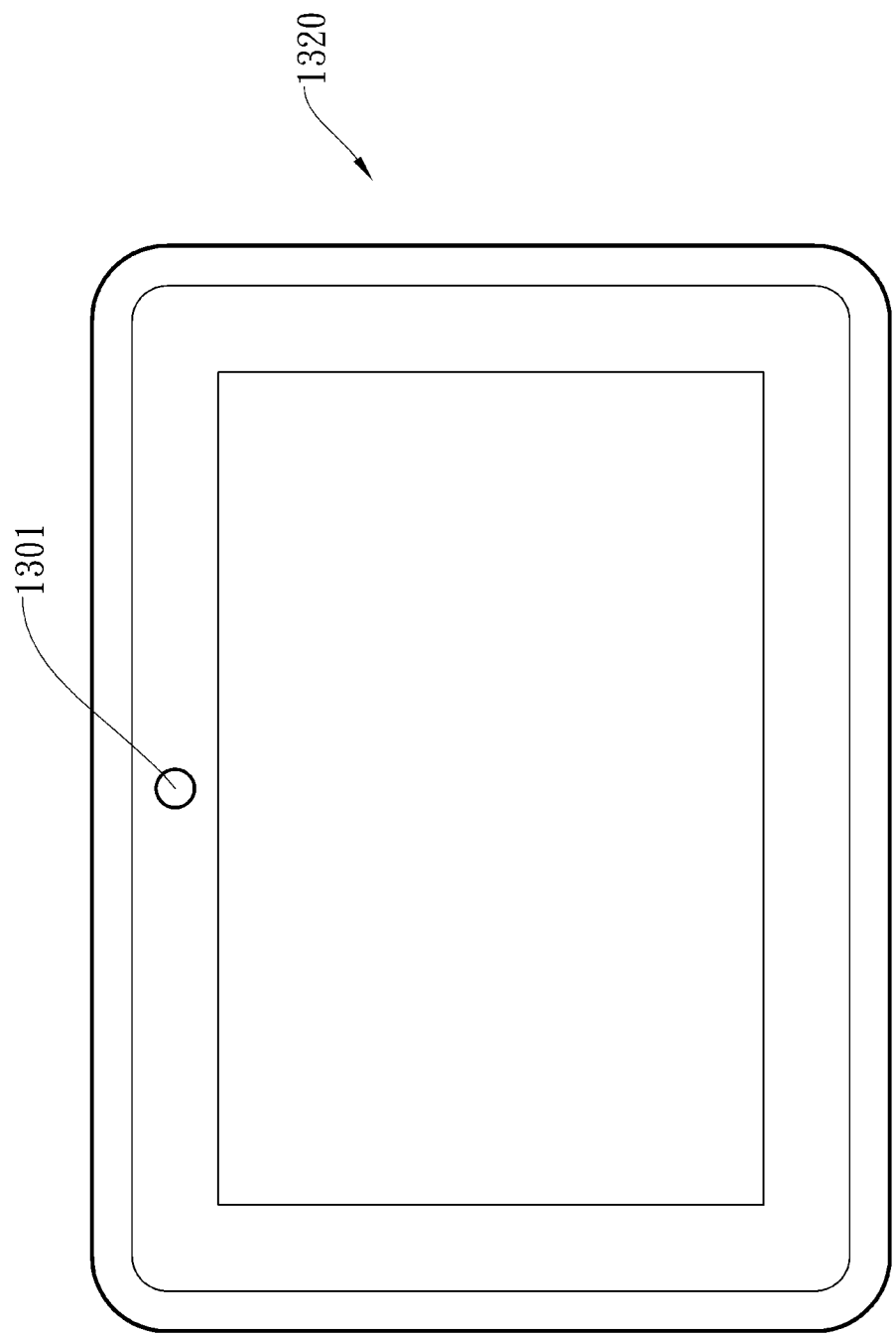
FIG. 13B shows a tablet with an imaging apparatus of the present disclosure installed therein.
Figure 13C:
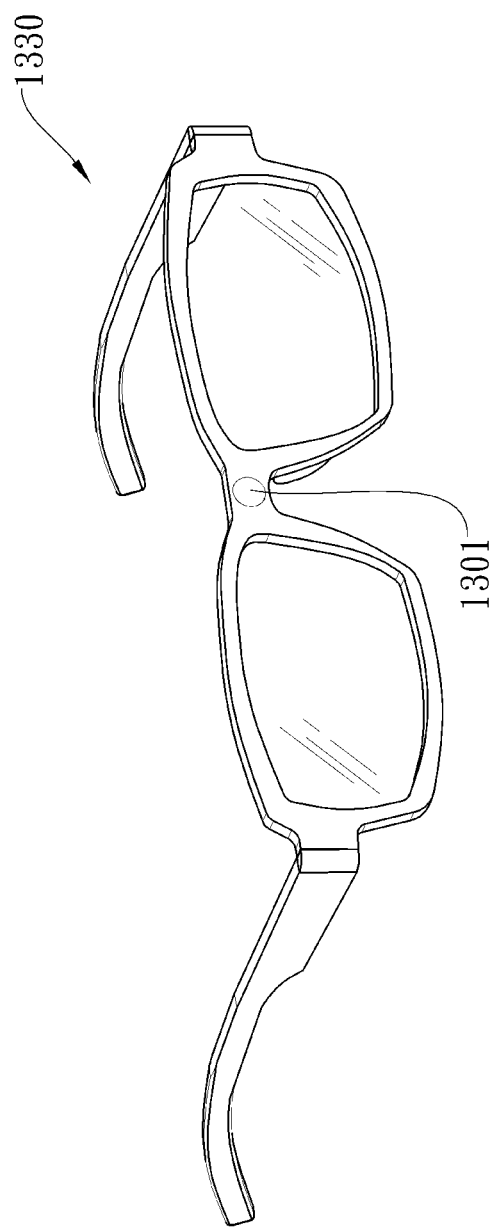
FIG. 13C shows a wearable device with an imaging apparatus of the present disclosure installed therein.
Figure 14A:
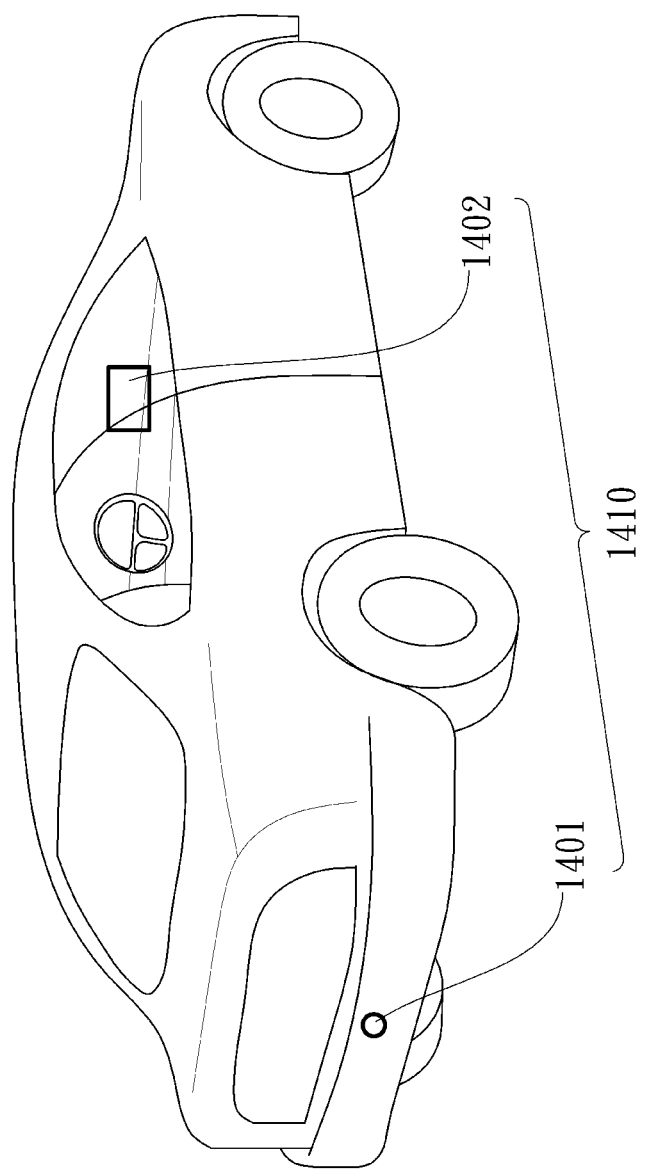
FIG. 14A shows a rear view camera with an imaging apparatus of the present disclosure installed therein.
Figure 14B:
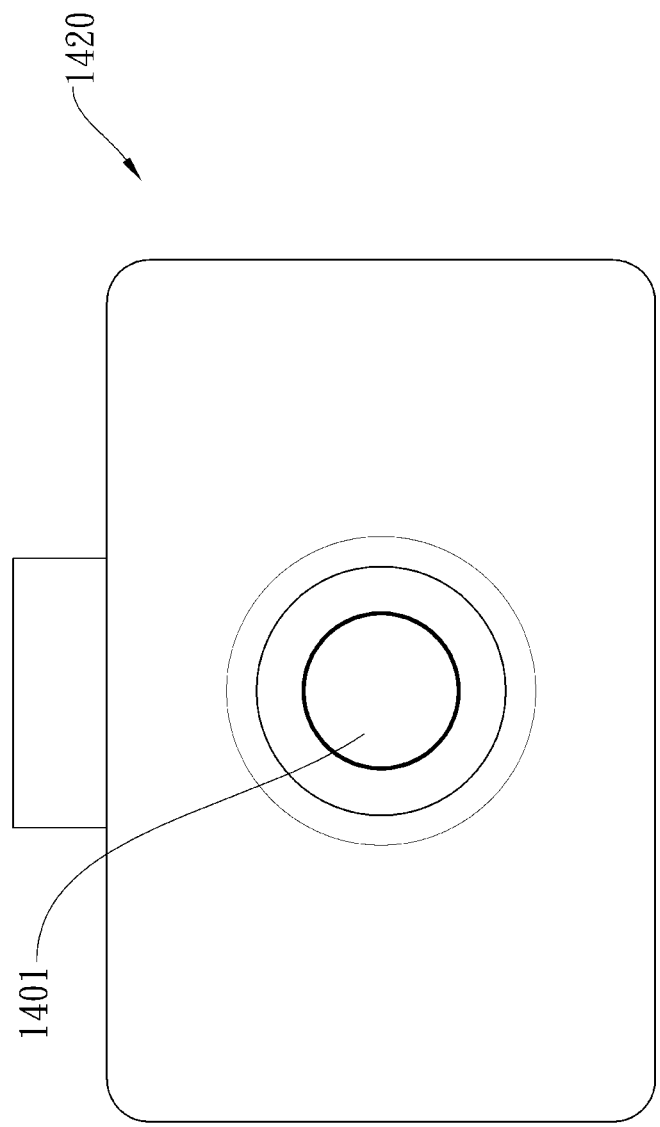
FIG. 14B shows a driving recording system with an imaging apparatus of the present disclosure installed therein.
Figure 14C:
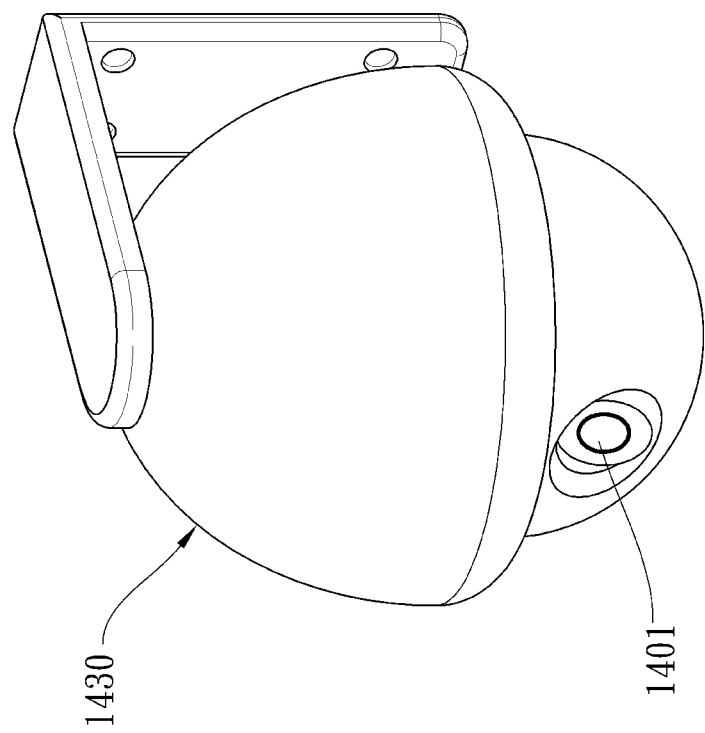
FIG. 14C shows a surveillance camera with an imaging apparatus of the present disclosure installed therein.

Please refer to FIG. 13A, FIG. 13B and FIG. 13C, an imaging apparatus 1301 may be installed in an electronic device including, but not limited to, a smartphone 1310, a tablet 1320, or a wearable device 1330. Also, please refer to FIG. 14A, FIG. 14B and FIG. 14C, an imaging apparatus 1401 (optionally with a display screen 1402) may be installed in an electronic device including, but not limited to, a rear view camera 1410, a driving recording system 1420, or a surveillance camera 1430. The above figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-11th specific embodiments are provided for further explanation.

1st Embodiment

Figure 1B:
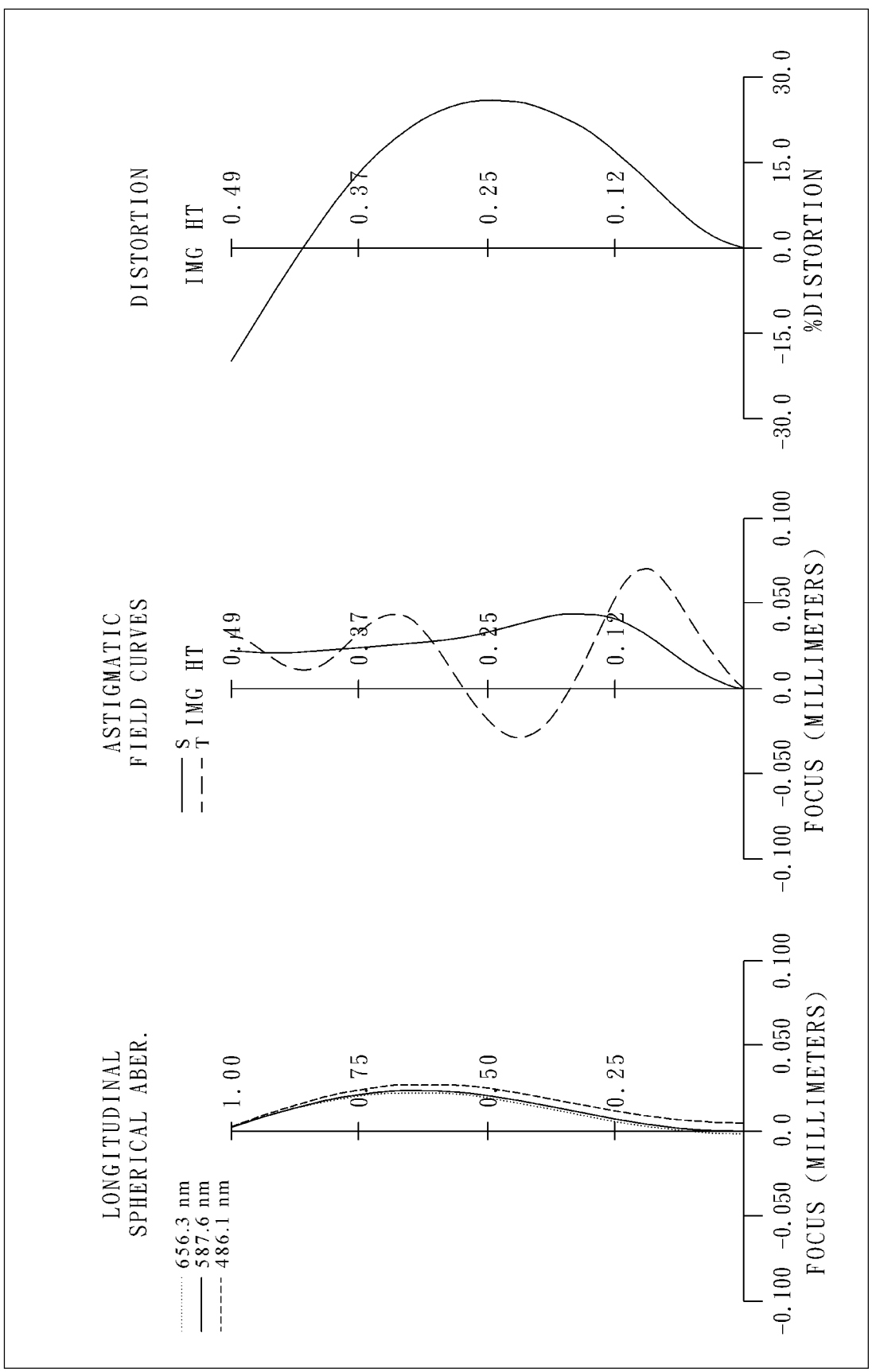
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes a micro imaging system (not otherwise herein labeled) of the present disclosure and an image sensor 160. The micro imaging system includes, in order from an object side to an image side, a first lens element 110, an aperture stop 100, a second lens element 120, and a third lens element 130.

The first lens element 110 with negative refractive power has an object-side surface 111 being concave in a paraxial region thereof, an image-side surface 112 being concave in a paraxial region thereof, both the object-side surface 111 and the image-side surface 112 being aspheric, and one inflection point on the object-side surface 111. The first lens element 110 is made of plastic material.

The second lens element 120 with positive refractive power has an object-side surface 121 being convex in a paraxial region thereof, an image-side surface 122 being convex in a paraxial region thereof, and both the object-side surface 121 and the image-side surface 122 being aspheric. The second lens element 120 is made of plastic material.

The third lens element 130 with negative refractive power has an object-side surface 131 being concave in a paraxial region thereof, an image-side surface 132 being convex in a paraxial region thereof, both the object-side surface 131 and the image-side surface 132 being aspheric, two inflection points on the object-side surface 131, and two inflection points on the image-side surface 132. The third lens element 130 is made of plastic material.

The micro imaging system further includes an IR cut filter 140 located between the third lens element 130 and an image surface 150. The IR cut filter 140 is made of glass material and will not affect the focal length of the micro imaging system. The image sensor 160 is disposed on or near the image surface 150 of the micro imaging system.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 0.24 mm, Fno = 3.00, HFOV = 69.0 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | −10.693 | ASP | 0.400 | Plastic | 1.544 | 56.0 | −0.40 |
| 2 | | 0.223 | ASP | 0.400 | | | | |
| 3 | Ape. Stop | Plano | | 0.020 | | | | |
| 4 | Lens 2 | 0.421 | ASP | 0.288 | Plastic | 1.544 | 56.0 | 0.22 |
| 5 | | −0.125 | ASP | 0.035 | | | | |

TABLE 1-continued (1st Embodiment)
f = 0.24 mm, Fno = 3.00, HFOV = 69.0 deg.

| Surface # | | Curvature Radius | | Thickness | Material | Index | Abbe # | Focal Length |
|---|---|---|---|---|---|---|---|---|
| 6 | Lens 3 | −0.178 | ASP | 0.200 | Plastic | 1.671 | 19.5 | −0.48 |
| 7 | | −0.572 | ASP | 0.060 | | | | |
| 8 | IR Cut Filter | Plano | | 0.400 | Glass | 1.517 | 64.2 | — |
| 9 | | Plano | | 0.044 | | | | |
| 10 | Image Surface | Plano | | — | | | | |

* Reference wavelength is d-line 587.6 nm.

TABLE 2

Aspheric Coefficients

| Surface # | 1 | 2 | 4 | 5 | 6 | 7 |
|---|---|---|---|---|---|---|
| k = | −9.0000E+01 | −3.1239E−01 | 8.9435E−01 | −6.9023E−01 | −3.0378E+00 | 2.8622E+00 |
| A4 = | 1.5578E−01 | −3.3874E+01 | −2.6977E+01 | 2.0211E+02 | 2.0421E+02 | 1.0722E+02 |
| A6 = | | 4.3531E+02 | 4.5203E+03 | −1.1174E+04 | −1.4298E+04 | −3.4559E+03 |
| A8 = | | −3.3015E+03 | −4.9023E+05 | 3.9638E+05 | 4.9346E+05 | 6.1057E+04 |
| A10 = | | −3.3733E+03 | 2.2714E+07 | −7.2517E+06 | −9.1160E+06 | −5.6309E+05 |
| A12 = | | | −3.4365E+08 | 5.5593E+07 | 6.8322E+07 | 2.1876E+06 |

The equation of the aspheric surface profiles is expressed as follows:

$$X(Y) = (Y^2/R)/\left(1 + \text{sqrt}\left(1 - (1+k)*(Y/R)^2\right)\right) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, a focal length of the micro imaging system is f, an f-number of the micro imaging system is Fno, a half of a maximal field of view of the micro imaging system is HFOV, and these parameters have the following values: f=0.24 mm; Fno=3.00; and HFOV=69.0 degrees.

In the 1st embodiment, an Abbe number of the second lens element 120 is V2, an Abbe number of the third lens element 130 is V3, and they satisfy the condition: V2/V3=2.87.

In the 1st embodiment, a central thickness of the first lens element 110 is CT1, a central thickness of the second lens element 120 is CT2, and they satisfy the condition: CT2/CT1=0.72.

In the 1st embodiment, the central thickness of the first lens element 110 is CT1, an axial distance between the first lens element 110 and the second lens element 120 is T12, and they satisfy the condition: T12/CT1=1.05.

In the 1st embodiment, the axial distance between the first lens element 110 and the second lens element 120 is T12, the focal length of the micro imaging system is f, and they satisfy the condition: T12/f=1.77.

In the 1st embodiment, the axial distance between the first lens element 110 and the second lens element 120 is T12, an axial distance between the second lens element 120 and the third lens element 130 is T23, the central thickness of the first lens element is CT1, and they satisfy the condition: (T12+T23)/CT1=1.14.

In the 1st embodiment, a curvature radius of the object-side surface 121 of the second lens element 120 is R3, a curvature radius of the image-side surface 122 of the second lens element 120 is R4, and they satisfy the condition: (R3−R4)/(R3+R4)=1.84.

In the 1st embodiment, the curvature radius of the image-side surface 122 of the second lens element 120 is R4, a curvature radius of the object-side surface 131 of the third lens element 130 is R5, and they satisfy the condition: (R4+R5)/(R4−R5)=−5.71.

In the 1st embodiment, the curvature radius of the image-side surface 122 of the second lens element 120 is R4, the central thickness of the second lens element 120 is CT2, and they satisfy the condition: R4/CT2=−0.43.

In the 1st embodiment, the curvature radius of the object-side surface 131 of the third lens element 130 is R5, a curvature radius of the image-side surface 132 of the third lens element 130 is R6, and they satisfy the condition: |R5/R6|=0.31.

In the 1st embodiment, a focal length of the first lens element 110 is f1, a focal length of the second lens element 120 is f2, and they satisfy the condition: f2/f1=−0.55.

In the 1st embodiment, the focal length of the micro imaging system is f, the focal length of the second lens element 120 is f2, and they satisfy the condition: f/f2=1.09.

In the 1st embodiment, a sum of axial distances between every two adjacent lens elements of the micro imaging system is ΣAT, a sum of central thicknesses of the first lens element 110, the second lens element 120, and the third lens element 130 is ΣCT, and they satisfy the condition: ΣAT/ΣCT=0.51.

In the 1st embodiment, an axial distance between the object-side surface 111 of the first lens element 110 and the image surface 150 is TL, the focal length of the micro imaging system is f, and they satisfy the condition: TL/f=7.79.

In the 1st embodiment, a maximum image height of the micro imaging system is ImgH (that is, a half of the diagonal length of an effective sensing area of the image sensor 160), the focal length of the micro imaging system is f, and they satisfy the condition: ImgH/f=2.09.

In the 1st embodiment, an axial distance between the aperture stop 100 and the image-side surface 132 of the third lens element 130 is SD, an axial distance between the object-side surface 111 of the first lens element 110 and the image-side surface 132 of the third lens element 130 is TD, and they satisfy the condition: SD/TD=0.40.

In the 1st embodiment, a vertical distance between an inflection point on the image-side surface 132 of the third lens element 130 and an optical axis is Yp32, the focal length of the micro imaging system is f. Since there are two inflection points on the image-side surface 132 of the third lens element 130, they satisfy the condition: Yp32/f=0.13 and Yp32/f=0.76, respectively.

2nd Embodiment

Figure 2A:
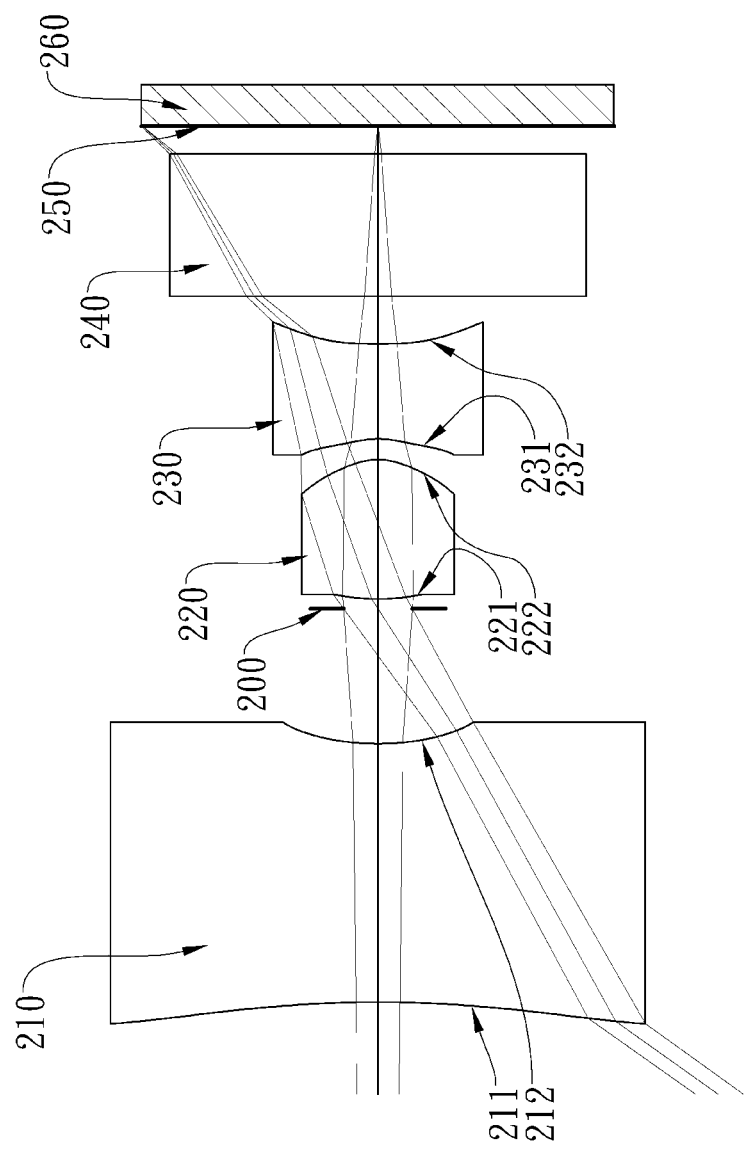
FIG. 2A is a schematic view of an imaging apparatus according to the 2nd embodiment of the present disclosure.
Figure 2B:
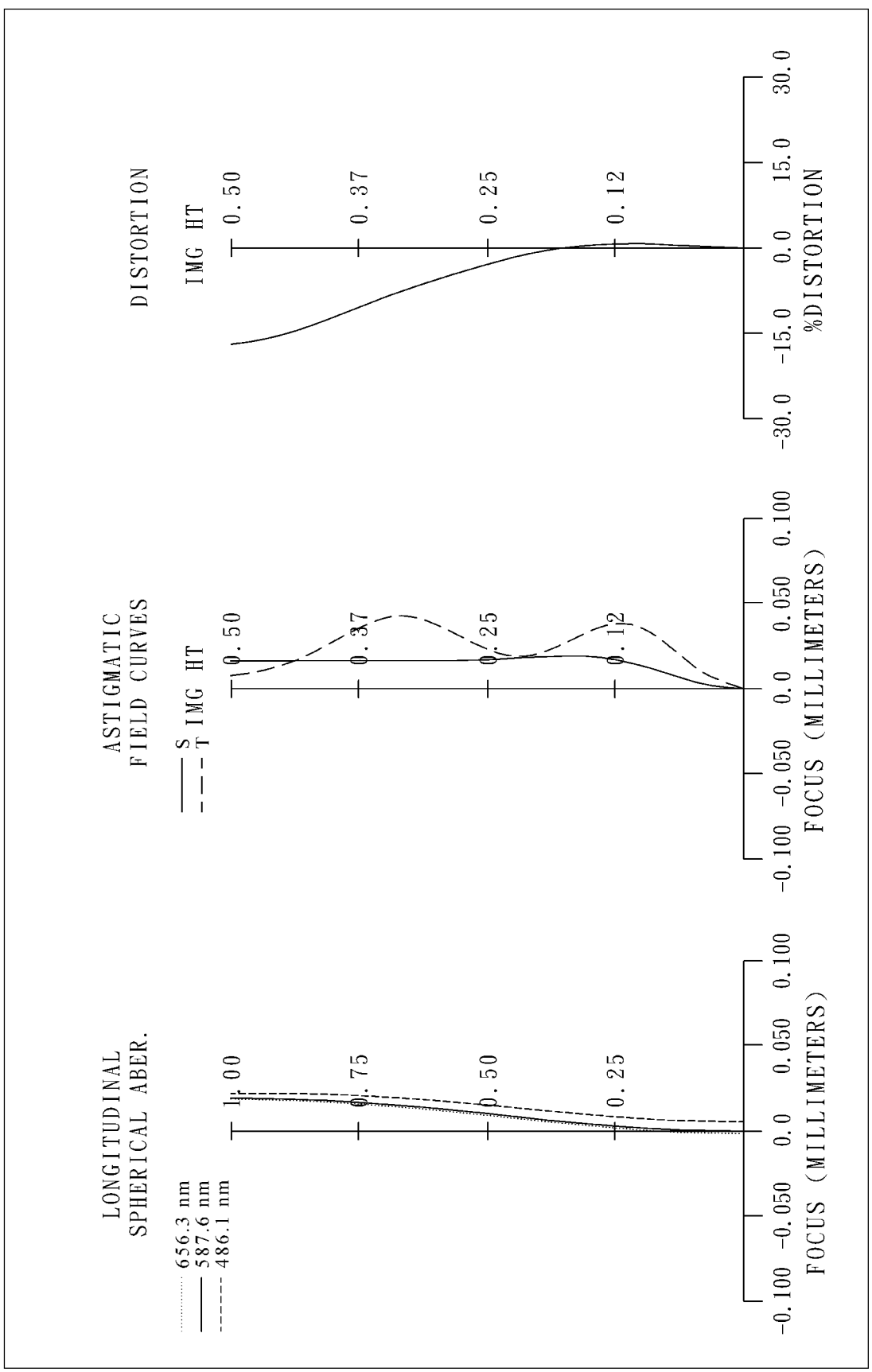
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes a micro imaging system (not otherwise herein labeled) of the present disclosure and an image sensor 260. The micro imaging system includes, in order from an object side to an image side, a first lens element 210, an aperture stop 200, a second lens element 220, and a third lens element 230.

The first lens element 210 with negative refractive power has an object-side surface 211 being concave in a paraxial region thereof, an image-side surface 212 being concave in a paraxial region thereof, both the object-side surface 211 and the image-side surface 212 being aspheric, and one inflection point on the object-side surface 211. The first lens element 210 is made of plastic material.

The second lens element 220 with positive refractive power has an object-side surface 221 being convex in a paraxial region thereof, an image-side surface 222 being convex in a paraxial region thereof, and both the object-side surface 221 and the image-side surface 222 being aspheric. The second lens element 220 is made of plastic material.

The third lens element 230 with negative refractive power has an object-side surface 231 being concave in a paraxial region thereof, an image-side surface 232 being concave in a paraxial region thereof, both the object-side surface 231 and the image-side surface 232 being aspheric, and two inflection points on the object-side surface 231. The third lens element 230 is made of plastic material.

The micro imaging system further includes an IR cut filter 240 located between the third lens element 230 and an image surface 250. The IR cut filter 240 is made of glass material and will not affect the focal length of the micro imaging system. The image sensor 260 is disposed on or near the image surface 250 of the micro imaging system.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 0.42 mm, Fno = 4.38, HFOV = 54.1 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | -2.500 | ASP | 0.544 | Plastic | 1.534 | 55.9 | -0.78 |
| 2 | | 0.535 | ASP | 0.285 | | | | |
| 3 | Ape. Stop | Plano | | 0.020 | | | | |
| 4 | Lens 2 | 0.421 | ASP | 0.294 | Plastic | 1.544 | 56.0 | 0.22 |
| 5 | | -0.124 | ASP | 0.044 | | | | |
| 6 | Lens 3 | -0.174 | ASP | 0.200 | Plastic | 1.639 | 23.5 | -0.24 |
| 7 | | 2.250 | ASP | 0.100 | | | | |
| 8 | IR Cut Filter | Plano | | 0.300 | Glass | 1.517 | 64.2 | — |
| 9 | | Plano | | 0.063 | | | | |
| 10 | Image Surface | Plano | | — | | | | |

\* Reference wavelength is d-line 587.6 nm.

TABLE 4

Aspheric Coefficients

| Surface # | 1 | 2 | 4 | 5 | 6 | 7 |
|---|---|---|---|---|---|---|
| k = | 1.0000E+01 | -6.3071E+00 | 3.7751E-01 | -6.9208E-01 | -2.9057E+00 | -9.1152E+00 |
| A4 = | 1.5742E-01 | 4.6494E+00 | -1.0674E+01 | 1.8674E+02 | 2.0181E+02 | 6.2161E+01 |
| A6 = | 4.6365E-01 | 1.1339E+02 | 1.2870E+03 | -1.0097E+04 | -1.5712E+04 | -2.2715E+03 |
| A8 = | | -3.4016E+03 | -2.7603E+05 | 3.8941E+05 | 6.6945E+05 | 4.5195E+04 |
| A10 = | | 6.6319E+04 | 1.7062E+07 | -8.8089E+06 | -1.6395E+07 | -4.8884E+05 |
| A12 = | | | -2.9941E+08 | 8.9662E+07 | 1.6718E+08 | 2.2576E+06 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 0.42 | R4/CT2 | −0.42 |
| Fno. | 4.38 | |R5/R6| | 0.08 |
| HFOV [deg.] | 54.1 | f2/f1 | −0.28 |
| V2/V3 | 2.38 | f/f2 | 1.92 |
| CT2/CT1 | 0.54 | ΣAT/ΣCT | 0.34 |
| T12/CT1 | 0.56 | TL/f | 4.43 |
| T12/f | 0.73 | ImgH/f | 1.19 |
| (T12 + T23)/CT1 | 0.64 | SD/TD | 0.40 |
| (R3 − R4)/(R3 + R4) | 1.84 | Yp32/f | — |
| (R4 + R5)/(R4 − R5) | −6.00 | | |

3rd Embodiment

Figure 3A:
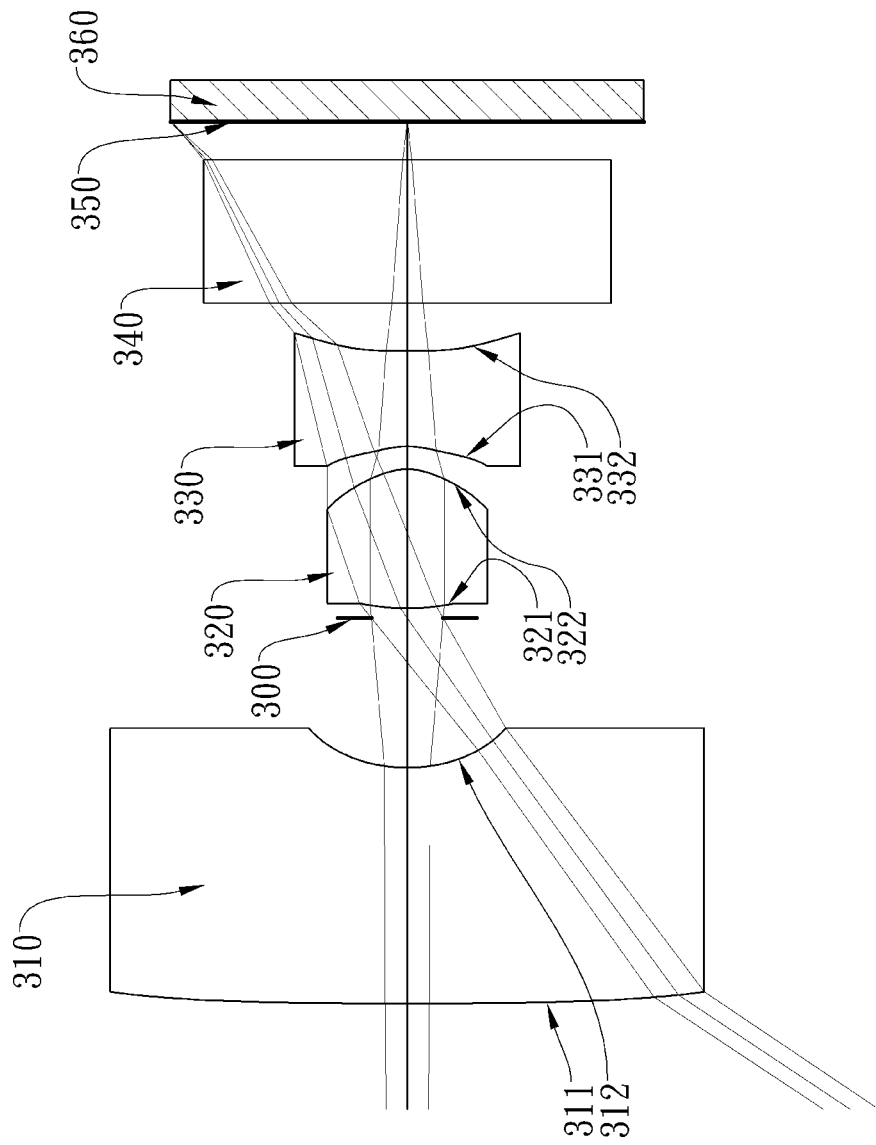
FIG. 3A is a schematic view of an imaging apparatus according to the 3rd embodiment of the present disclosure.
Figure 3B:
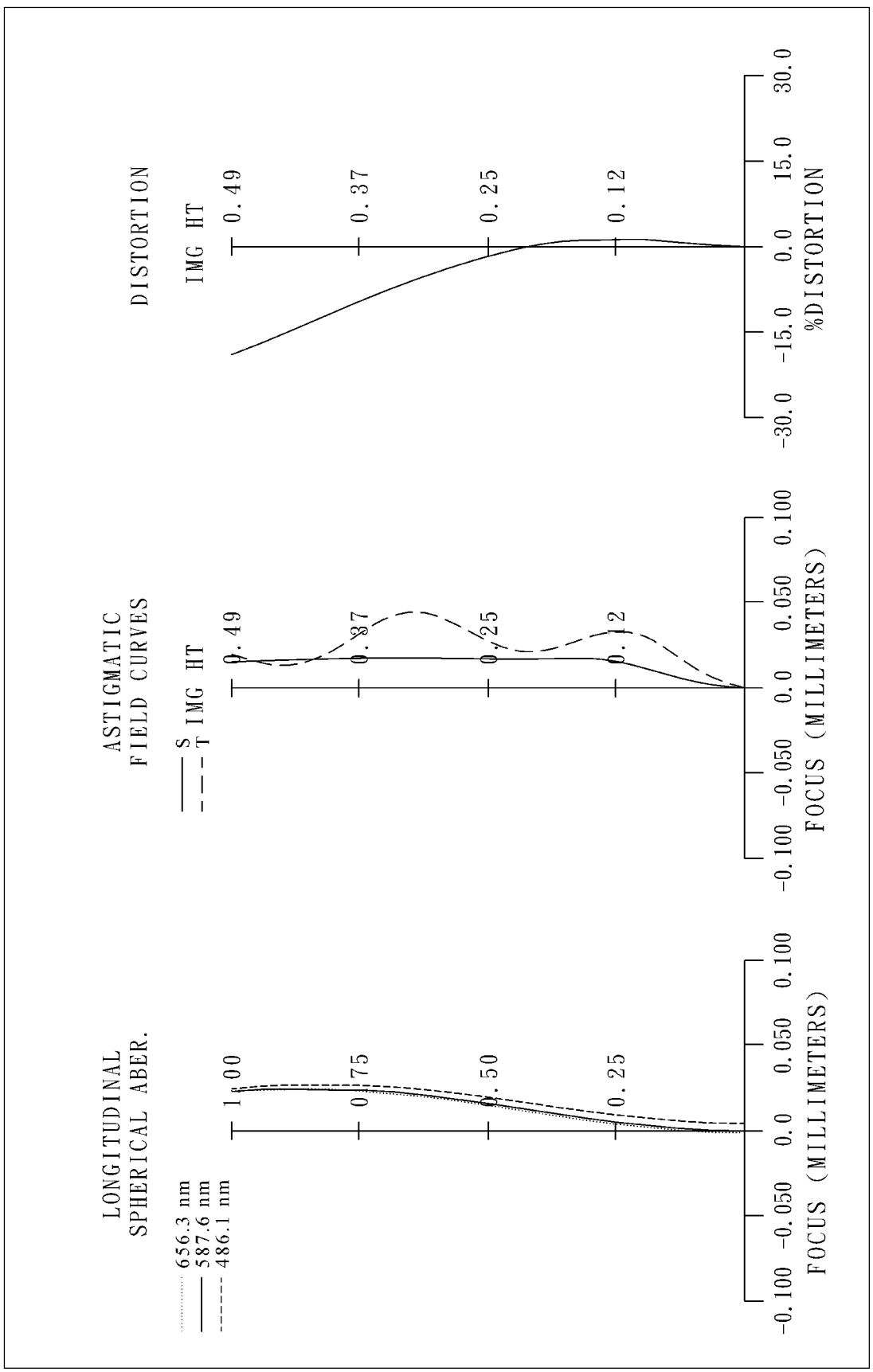
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes a micro imaging system (not otherwise herein labeled) of the present disclosure and an image sensor 360. The micro imaging system includes, in order from an object side to an image side, a first lens element 310, an aperture stop 300, a second lens element 320, and a third lens element 330.

The first lens element 310 with negative refractive power has an object-side surface 311 being convex in a paraxial region thereof, an image-side surface 312 being concave in a paraxial region thereof, and both the object-side surface 311 and the image-side surface 312 being aspheric. The first lens element 310 is made of plastic material.

The second lens element 320 with positive refractive power has an object-side surface 321 being convex in a paraxial region thereof, an image-side surface 322 being convex in a paraxial region thereof, and both the object-side surface 321 and the image-side surface 322 being aspheric. The second lens element 320 is made of plastic material.

The third lens element 330 with negative refractive power has an object-side surface 331 being concave in a paraxial region thereof, an image-side surface 332 being concave in a paraxial region thereof, and both the object-side surface 331 and the image-side surface 332 being aspheric. The third lens element 330 is made of plastic material.

The micro imaging system further includes an IR cut filter 340 located between the third lens element 330 and an image surface 350. The IR cut filter 340 is made of glass material and will not affect the focal length of the micro imaging system. The image sensor 360 is disposed on or near the image surface 350 of the micro imaging system.

The detailed optical data of the 3rd embodiment are shown in TABLE 5, and the aspheric surface data are shown in TABLE 6, wherein the units of the curvature radius, the thickness and the focal length are expressed in mm, and HFOV is a half of the maximal field of view.

TABLE 5

(3rd Embodiment)
f = 0.40 mm, Fno = 4.14, HFOV = 55.9 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | 19.531 | ASP | 0.494 | Plastic | 1.534 | 55.9 | −0.61 |
| 2 | | 0.320 | ASP | 0.314 | | | | |
| 3 | Ape. Stop | Plano | | 0.020 | | | | |
| 4 | Lens 2 | 0.421 | ASP | 0.292 | Plastic | 1.544 | 56.0 | 0.22 |
| 5 | | −0.124 | ASP | 0.048 | | | | |
| 6 | Lens 3 | −0.170 | ASP | 0.200 | Plastic | 1.639 | 23.5 | −0.27 |
| 7 | | 91.766 | ASP | 0.100 | | | | |
| 8 | IR Cut Filter | Plano | | 0.300 | Glass | 1.517 | 64.2 | — |
| 9 | | Plano | | 0.084 | | | | |
| 10 | Image Surface | Plano | | — | | | | |

\* Reference wavelength is d-line 587.6 nm.

TABLE 6

Aspheric Coefficients

| Surface # | 1 | 2 | 4 | 5 | 6 | 7 |
|---|---|---|---|---|---|---|
| k = | −8.9992E+01 | −2.0282E+00 | −9.2593E−02 | −6.9411E−01 | −2.4737E+00 | −9.0000E+01 |
| A4 = | 7.7194E−02 | 2.1930E+00 | −1.4863E+01 | 1.6763E+02 | 1.8685E+02 | 5.4221E+01 |
| A6 = | 5.9844E−02 | 5.2070E+02 | 1.8942E+03 | −8.6477E+03 | −1.3671E+04 | −1.8464E+03 |
| A8 = | | −1.4008E+04 | −3.3686E+05 | 3.2399E+05 | 5.3793E+05 | 3.3827E+04 |
| A10 = | | 1.7784E+05 | 1.9856E+07 | −6.9445E+06 | −1.1990E+07 | −3.3226E+05 |
| A12 = | | | −3.4357E+08 | 6.5415E+07 | 1.0958E+08 | 1.3647E+06 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 0.40 | R4/CT2 | −0.42 |
| Fno. | 4.14 | \|R5/R6\| | 0.002 |
| HFOV [deg.] | 55.9 | f2/f1 | −0.35 |
| V2/V3 | 2.38 | f/f2 | 1.83 |
| CT2/CT1 | 0.59 | ΣAT/ΣCT | 0.39 |
| T12/CT1 | 0.68 | TL/f | 4.66 |
| T12/f | 0.84 | ImgH/f | 1.25 |
| (T12 + T23)/CT1 | 0.77 | SD/TD | 0.41 |
| (R3 − R4)/(R3 + R4) | 1.83 | Yp32/f | — |
| (R4 + R5)/(R4 − R5) | −6.31 | | |

4th Embodiment

Figure 4A:
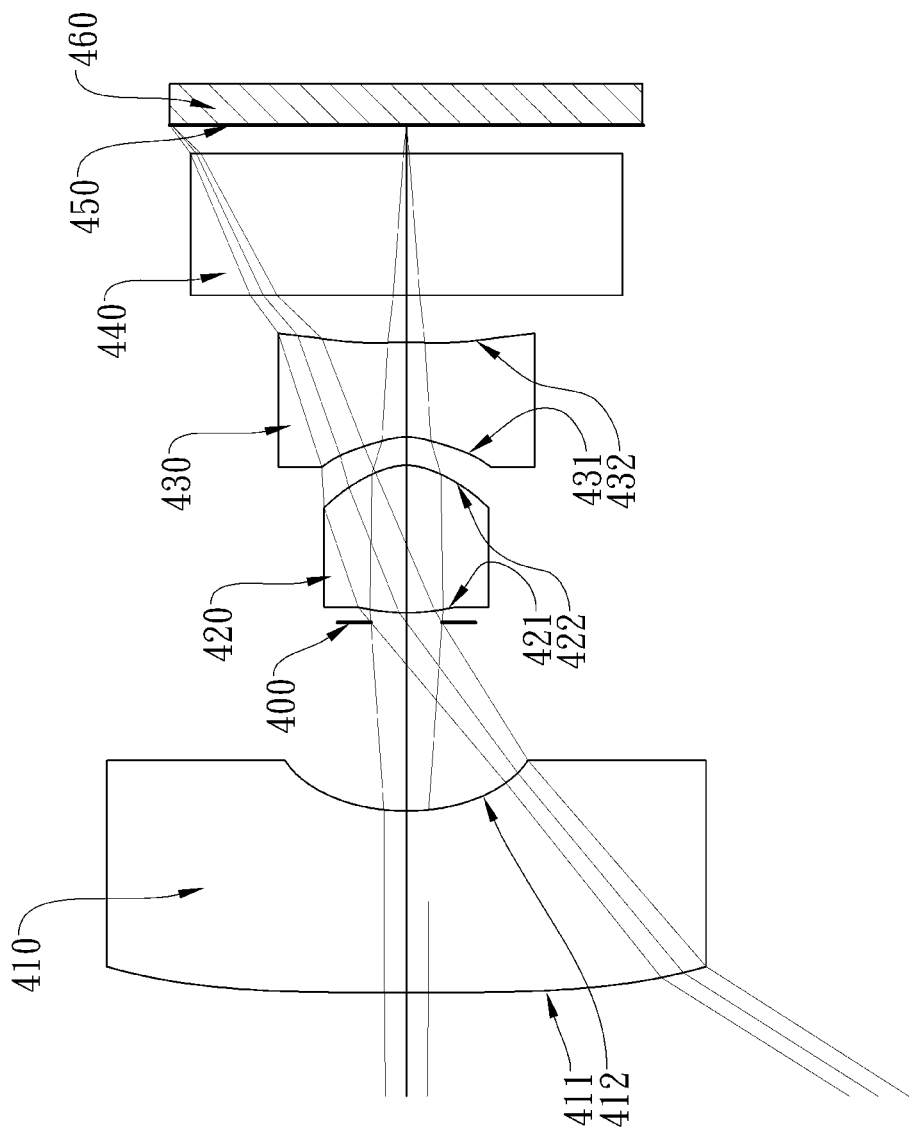
FIG. 4A is a schematic view of an imaging apparatus according to the 4th embodiment of the present disclosure.
Figure 4B:
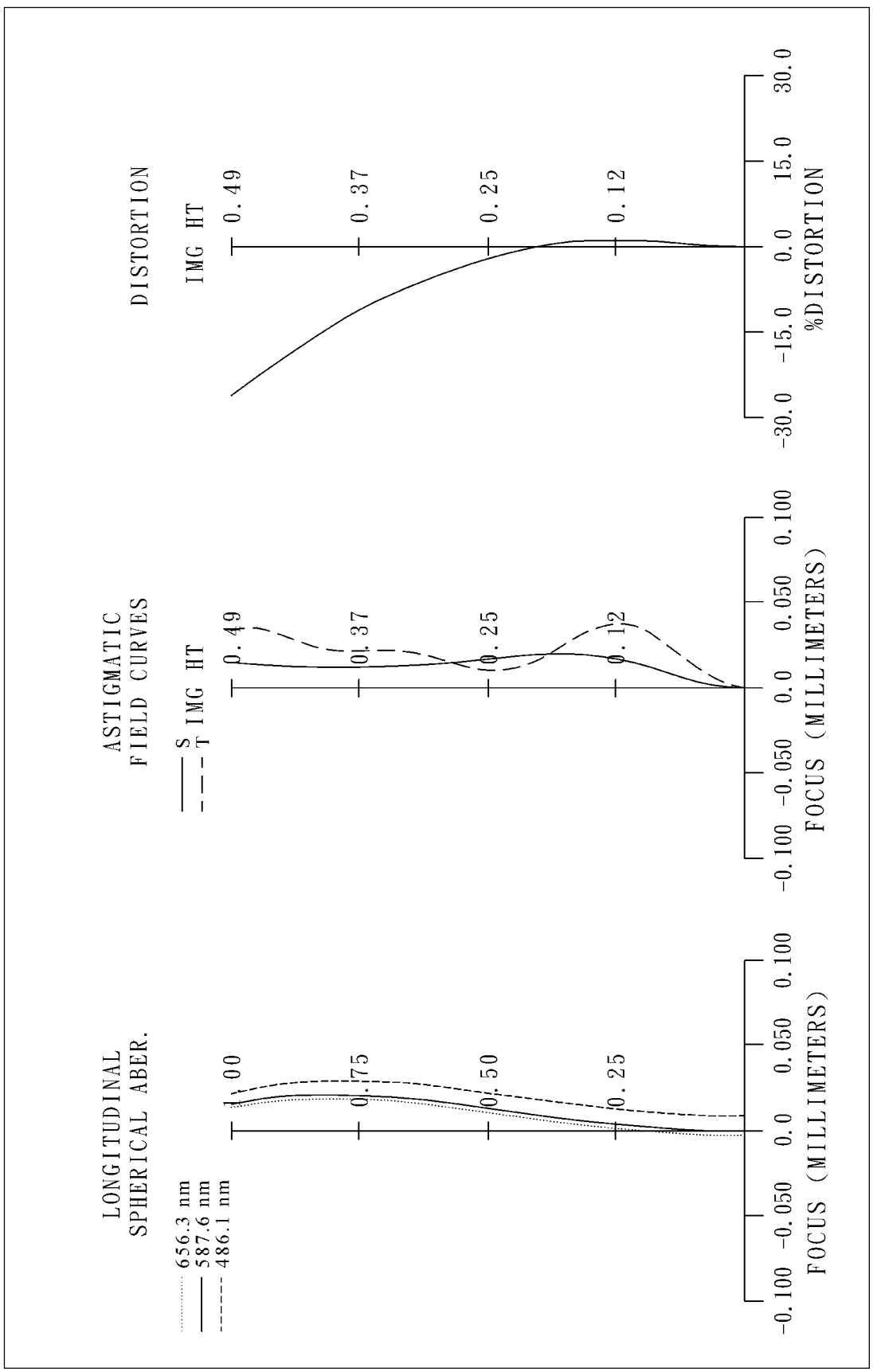
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a micro imaging system (not otherwise herein labeled) of the present disclosure and an image sensor 460. The micro imaging system includes, in order from an object side to an image side, a first lens element 410, an aperture stop 400, a second lens element 420, and a third lens element 430.

The first lens element 410 with negative refractive power has an object-side surface 411 being convex in a paraxial region thereof, an image-side surface 412 being concave in a paraxial region thereof, and both the object-side surface 411 and the image-side surface 412 being aspheric. The first lens element 410 is made of plastic material.

The second lens element 420 with positive refractive power has an object-side surface 421 being convex in a paraxial region thereof, an image-side surface 422 being convex in a paraxial region thereof, and both the object-side surface 421 and the image-side surface 422 being aspheric. The second lens element 420 is made of plastic material.

The third lens element 430 with negative refractive power has an object-side surface 431 being concave in a paraxial region thereof, an image-side surface 432 being convex in a paraxial region thereof, both the object-side surface 431 and the image-side surface 432 being aspheric, and three inflection points on the image-side surface 432. The third lens element 430 is made of plastic material.

The micro imaging system further includes an IR cut filter 440 located between the third lens element 430 and an image surface 450. The IR cut filter 440 is made of glass material and will not affect the focal length of the micro imaging system. The image sensor 460 is disposed on or near the image surface 450 of the micro imaging system.

The detailed optical data of the 4th embodiment are shown in TABLE 7, and the aspheric surface data are shown in TABLE 8, wherein the units of the curvature radius, the thickness and the focal length are expressed in mm, and HFOV is a half of the maximal field of view.

TABLE 7

(4th Embodiment)
f = 0.42 mm, Fno = 4.37, HFOV = 57.1 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | 16.409 | ASP | 0.385 | Plastic | 1.583 | 30.2 | −0.78 |
| 2 | | 0.440 | ASP | 0.399 | | | | |
| 3 | Ape. Stop | Plano | | 0.020 | | | | |
| 4 | Lens 2 | 0.409 | ASP | 0.312 | Plastic | 1.530 | 55.8 | 0.23 |
| 5 | | −0.125 | ASP | 0.060 | | | | |
| 6 | Lens 3 | −0.144 | ASP | 0.200 | Plastic | 1.660 | 20.4 | −0.26 |
| 7 | | −1.389 | ASP | 0.100 | | | | |
| 8 | IR Cut Filter | Plano | | 0.300 | Glass | 1.517 | 64.2 | — |
| 9 | | Plano | | 0.065 | | | | |
| 10 | Image Surface | Plano | | — | | | | |

* Reference wavelength is d-line 587.6 nm.

| Aspheric Coefficients | | | | | | |
|---|---|---|---|---|---|---|
| Surface # | 1 | 2 | 4 | 5 | 6 | 7 |
| k = | −9.0000E+01 | −9.5036E−01 | −1.4221E−01 | −7.0744E−01 | −1.7929E+00 | 1.9995E+01 |
| A4 = | 3.1637E−01 | 9.7710E−01 | −1.3380E+01 | 1.3535E+02 | 1.6779E+02 | 4.9156E+01 |
| A6 = | −1.0874E−01 | 1.3912E+02 | 6.7014E+02 | −6.1339E+03 | −1.1034E+04 | −1.4491E+03 |
| A8 = | | −2.3678E+03 | −4.4778E+04 | 2.2799E+05 | 3.8436E+05 | 2.2913E+04 |
| A10 = | | 2.5893E+04 | −6.5184E+05 | −5.0810E+06 | −7.7135E+06 | −1.9137E+05 |
| A12 = | | | 1.6072E+08 | 5.2662E+07 | 6.6375E+07 | 6.8220E+05 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 0.42 | R4/CT2 | −0.40 |
| Fno. | 4.37 | |R5/R6| | 0.10 |
| HFOV [deg.] | 57.1 | f2/f1 | −0.29 |
| V2/V3 | 2.73 | f/f2 | 1.85 |
| CT2/CT1 | 0.81 | ΣAT/ΣCT | 0.53 |
| T12/CT1 | 1.09 | TL/f | 4.41 |
| T12/f | 1.00 | ImgH/f | 1.19 |
| (T12 + T23)/CT1 | 1.25 | SD/TD | 0.43 |
| (R3 − R4)/(R3 + R4) | 1.88 | Yp32/f | 0.07/0.41/0.62 |
| (R4 + R5)/(R4 − R5) | −14.16 | | |

5th Embodiment

Figure 5A:
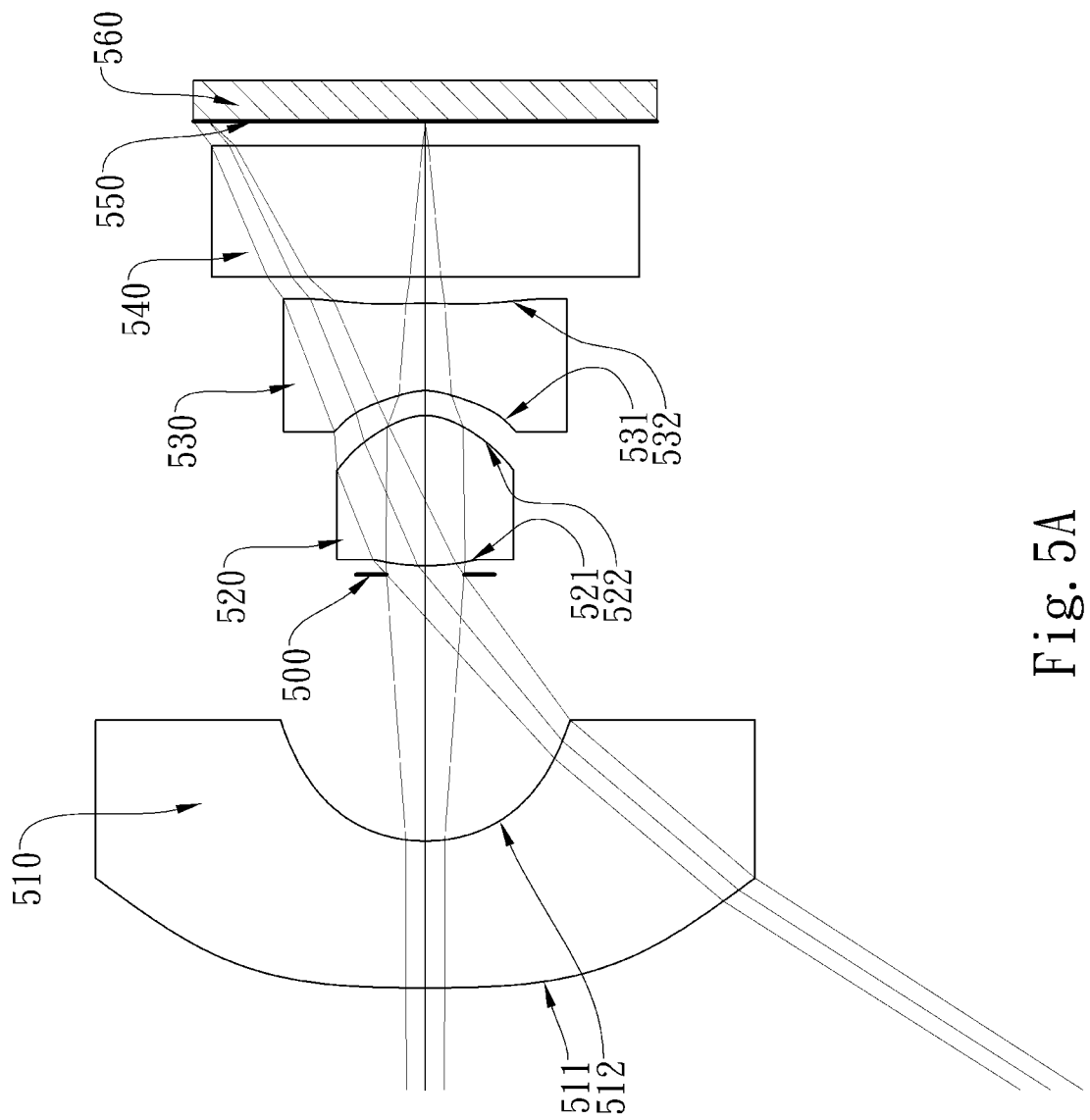
FIG. 5A is a schematic view of an imaging apparatus according to the 5th embodiment of the present disclosure.
Figure 5B:
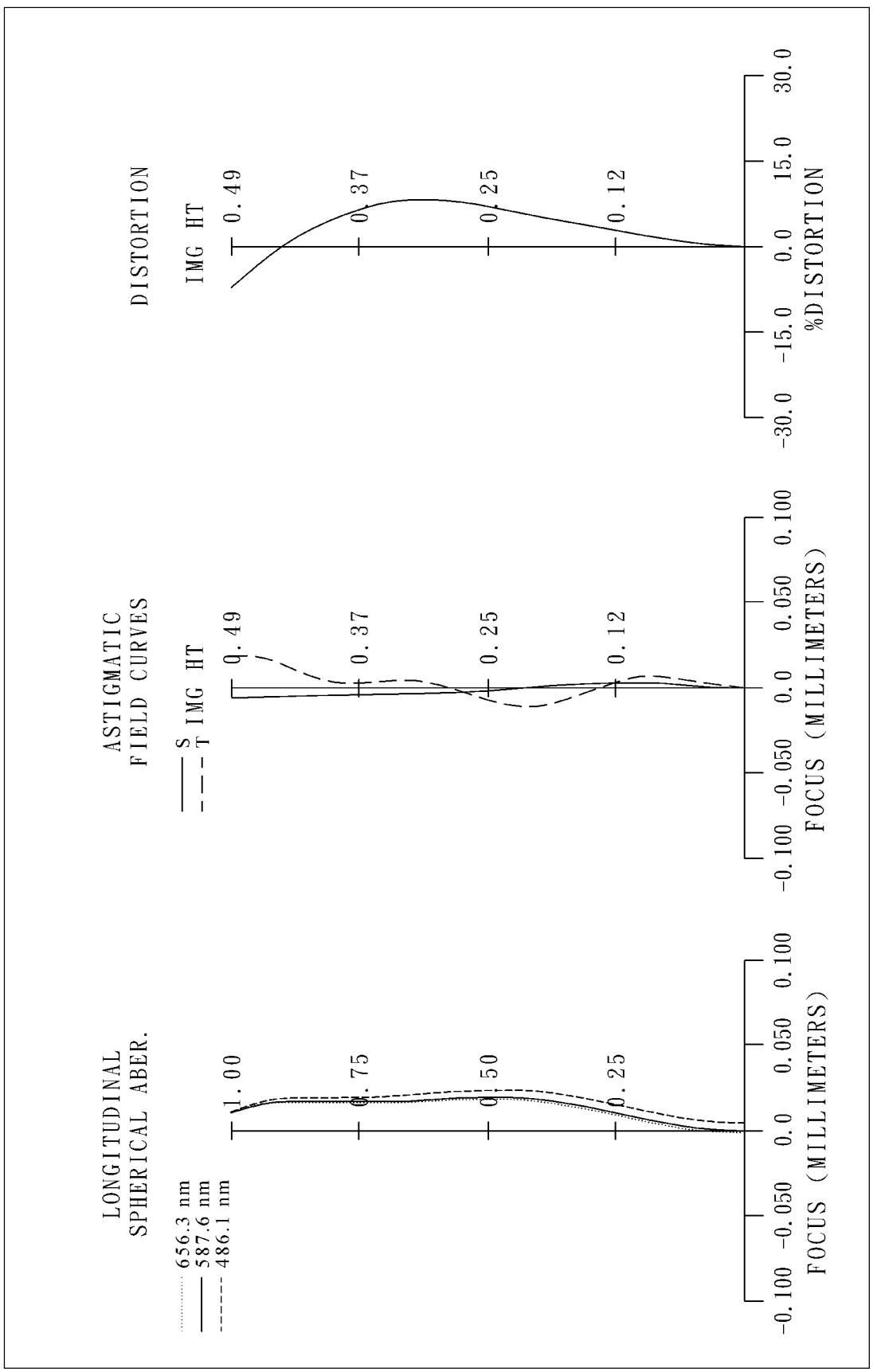
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes a micro imaging system (not otherwise herein labeled) of the present disclosure and an image sensor 560. The micro imaging system includes, in order from an object side to an image side, a first lens element 510, an aperture stop 500, a second lens element 520, and a third lens element 530.

The first lens element 510 with negative refractive power has an object-side surface 511 being convex in a paraxial region thereof, an image-side surface 512 being concave in a paraxial region thereof, both the object-side surface 511 and the image-side surface 512 being aspheric, and one inflection point on the object-side surface 511. The first lens element 510 is made of plastic material.

The second lens element 520 with positive refractive power has an object-side surface 521 being convex in a paraxial region thereof, an image-side surface 522 being convex in a paraxial region thereof, both the object-side surface 521 and the image-side surface 522 being aspheric, one inflection point on the object-side surface 521 and one inflection point on the image-side surface 522. The second lens element 520 is made of plastic material.

The third lens element 530 with negative refractive power has an object-side surface 531 being concave in a paraxial region thereof, an image-side surface 532 being convex in a paraxial region thereof, both the object-side surface 531 and the image-side surface 532 being aspheric, one inflection point on the object-side surface 531 and four inflection points on the image-side surface 532. The third lens element 530 is made of plastic material.

The micro imaging system further includes an IR cut filter 540 located between the third lens element 530 and an image surface 550. The IR cut filter 540 is made of glass material and will not affect the focal length of the micro imaging system. The image sensor 560 is disposed on or near the image surface 550 of the micro imaging system.

The detailed optical data of the 5th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(5th Embodiment)
f = 0.32 mm, Fno = 3.40, HFOV = 57.1 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | 3.938 | ASP | 0.336 | Plastic | 1.535 | 56.3 | −0.72 |
| 2 | | 0.340 | ASP | 0.609 | | | | |
| 3 | Ape. Stop | Plano | | 0.020 | | | | |
| 4 | Lens 2 | 0.419 | ASP | 0.344 | Plastic | 1.530 | 55.8 | 0.23 |
| 5 | | −0.124 | ASP | 0.056 | | | | |
| 6 | Lens 3 | −0.146 | ASP | 0.200 | Plastic | 1.660 | 20.4 | −0.28 |
| 7 | | −1.141 | ASP | 0.060 | | | | |
| 8 | IR Cut Filter | Plano | | 0.300 | Glass | 1.517 | 64.2 | — |
| 9 | | Plano | | 0.059 | | | | |
| 10 | Image Surface | Plano | | — | | | | |

* Reference wavelength is d-line 587.6 nm.

TABLE 10

| Aspheric Coefficients | | | |
|---|---|---|---|
| | Surface # | | |
| | 1 | 2 | 4 |
| k= | 1.9813E+01 | −1.2251E+00 | −7.1874E−01 |
| A4= | 1.0647E+00 | 3.5906E+00 | −4.6035E+01 |
| A6= | −1.0299E+00 | 8.8075E+01 | 1.1487E+04 |
| A8= | | −6.5988E+02 | −1.7997E+06 |
| A10= | | 3.8522E+03 | 1.2983E+08 |
| A12= | | | −3.4559E+09 |
| | Surface # | | |
| | 5 | 6 | 7 |
| k= | −7.0617E−01 | −1.6563E+00 | 1.0065E+01 |
| A4= | 1.1651E+02 | 1.4179E+02 | 3.5721E+01 |
| A6= | −4.1668E+03 | −8.4634E+03 | −8.3211E+02 |
| A8= | 1.3606E+05 | 2.7981E+05 | 1.0525E+04 |
| A10= | −2.7971E+06 | −5.4777E+06 | −7.1092E+04 |
| A12= | 2.7754E+07 | 4.4608E+07 | 2.0669E+05 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 0.32 | R4/CT2 | −0.36 |
| Fno. | 3.40 | |R5/R6| | 0.13 |
| HFOV [deg.] | 57.1 | f2/f1 | −0.32 |
| V2/V3 | 2.73 | f/f2 | 1.39 |
| CT2/CT1 | 1.02 | ΣAT/ΣCT | 0.78 |
| T12/CT1 | 1.87 | TL/f | 6.18 |
| T12/f | 1.96 | ImgH/f | 1.54 |
| (T12 + T23)/CT1 | 2.04 | SD/TD | 0.40 |
| (R3 − R4)/(R3 + R4) | 1.84 | Yp32/f | 0.12/0.56/0.93/1.00 |
| (R4 + R5)/(R4 − R5) | −11.87 | | |

6th Embodiment

Figure 6A:
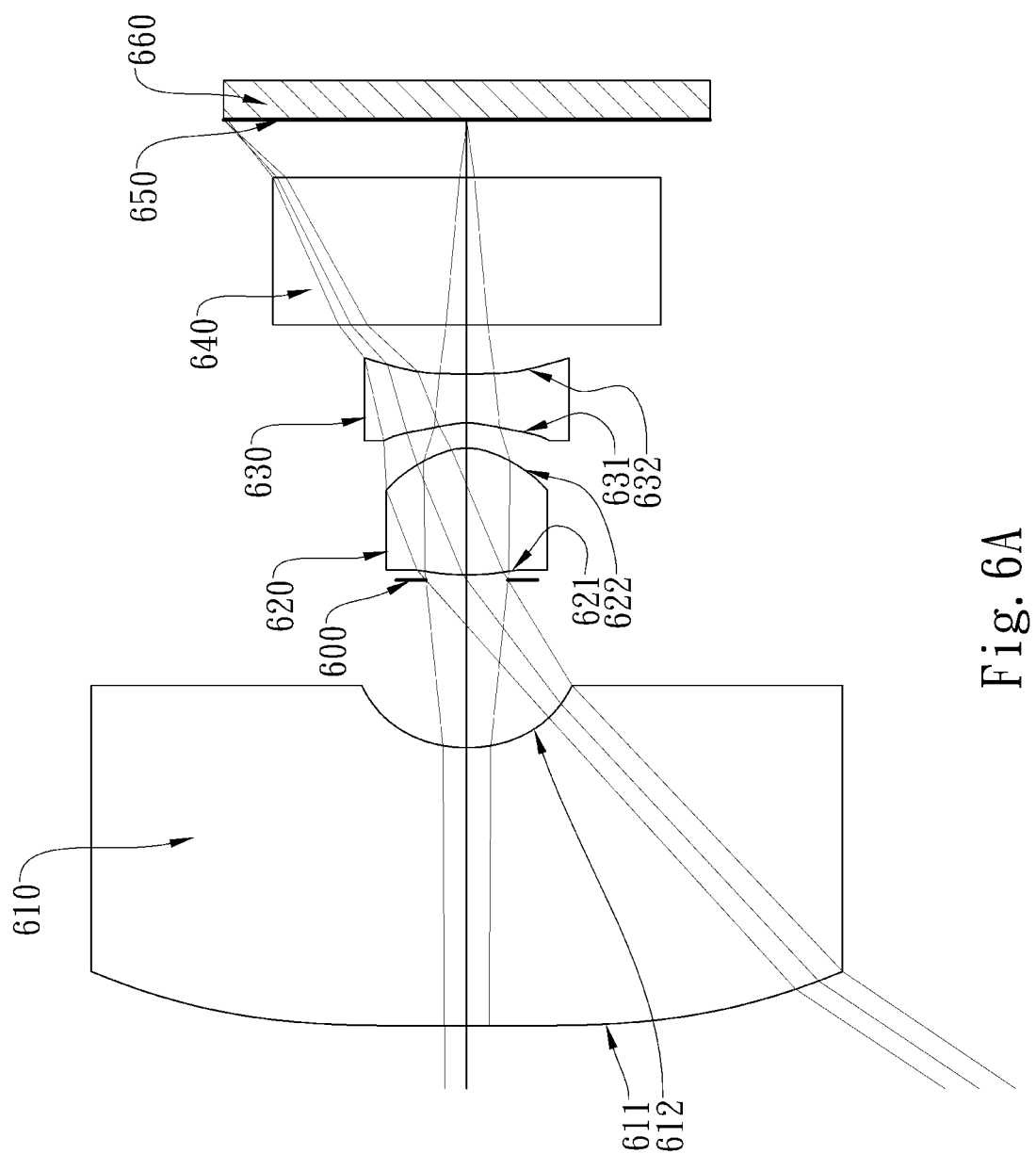
FIG. 6A is a schematic view of an imaging apparatus according to the 6th embodiment of the present disclosure.
Figure 6B:
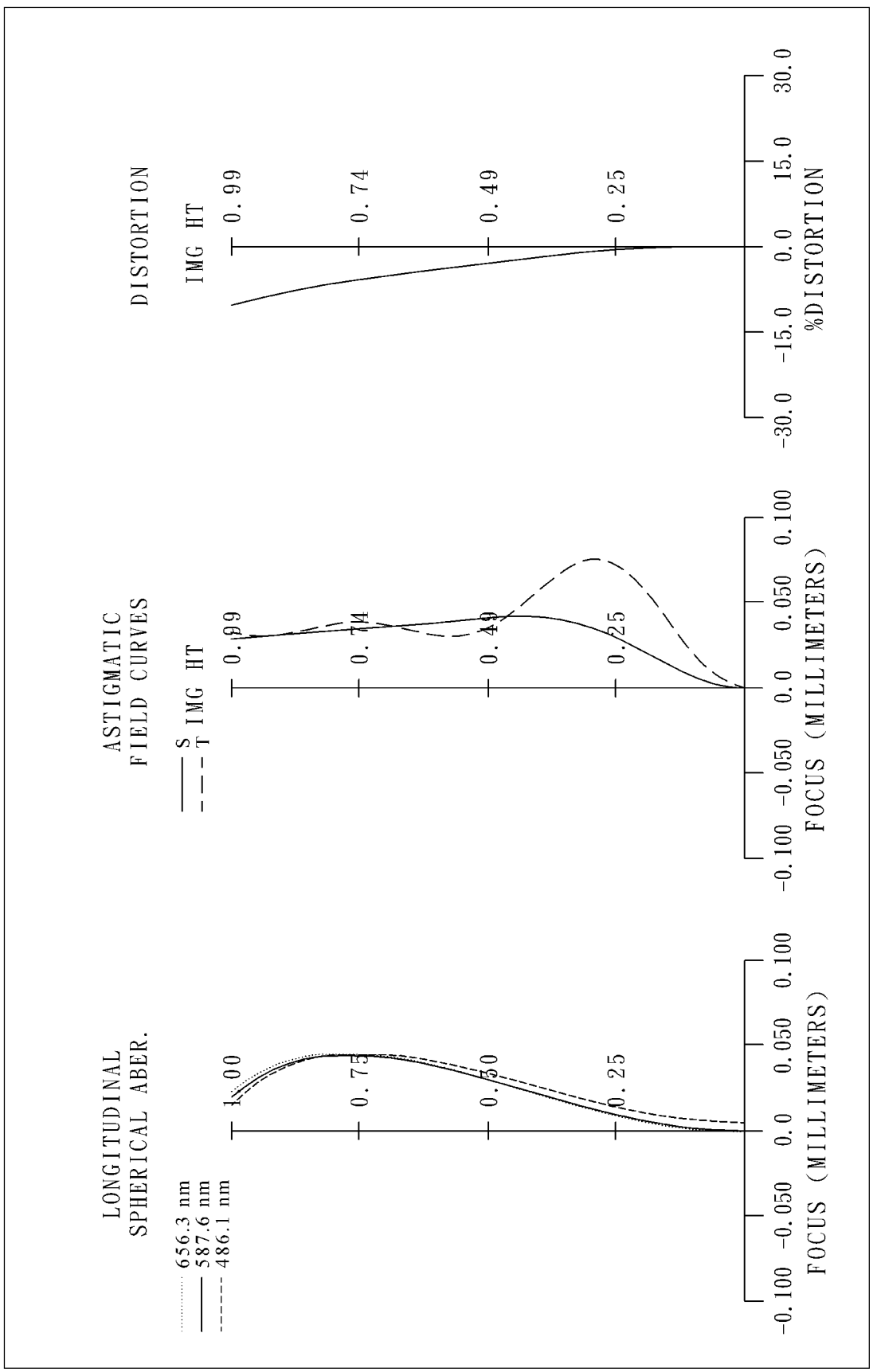
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes a micro imaging system (not otherwise herein labeled) of the present disclosure and an image sensor 660. The micro imaging system includes, in order from an object side to an image side, a first lens element 610, an aperture stop 600, a second lens element 620, and a third lens element 630.

The first lens element 610 with negative refractive power has an object-side surface 611 being convex in a paraxial region thereof, an image-side surface 612 being concave in a paraxial region thereof, and both the object-side surface 611 and the image-side surface 612 being aspheric. The first lens element 610 is made of plastic material.

The second lens element 620 with positive refractive power has an object-side surface 621 being convex in a paraxial region thereof, an image-side surface 622 being convex in a paraxial region thereof, and both the object-side surface 621 and the image-side surface 622 being aspheric. The second lens element 620 is made of plastic material.

The third lens element 630 with negative refractive power has an object-side surface 631 being concave in a paraxial region thereof, an image-side surface 632 being convex in a paraxial region thereof, both the object-side surface 631 and the image-side surface 632 being aspheric, two inflection points on the object-side surface 631 and one inflection point on the image-side surface 632. The third lens element 630 is made of plastic material.

The micro imaging system further includes an IR cut filter 640 located between the third lens element 630 and an image surface 650. The IR cut filter 640 is made of glass material and will not affect the focal length of the micro imaging system. The image sensor 660 is disposed on or near the image surface 650 of the micro imaging system.

The detailed optical data of the 6th embodiment are shown in TABLE 11, and the aspheric surface data are shown in TABLE 12, wherein the units of the curvature radius, the thickness and the focal length are expressed in mm, and HFOV is a half of the maximal field of view.

TABLE 11

(6th Embodiment)
f = 0.70 mm, Fno = 3.60, HFOV = 56.0 deg.

| Surface # | | Curvature Radius | | Thickness | Material | Index | Abbe # | Focal Length |
|---|---|---|---|---|---|---|---|---|
| 0 | Object | Plano | | 10.000 | | | | |
| 1 | Lens 1 | 1953.125 | ASP | 1.134 | Plastic | 1.534 | 55.9 | −1.07 |
| 2 | | 0.571 | ASP | 0.684 | | | | |
| 3 | Ape. Stop | Plano | | 0.020 | | | | |
| 4 | Lens 2 | 0.885 | ASP | 0.518 | Plastic | 1.544 | 56.0 | 0.42 |
| 5 | | −0.243 | ASP | 0.102 | | | | |
| 6 | Lens 3 | −0.344 | ASP | 0.200 | Plastic | 1.639 | 23.5 | −0.54 |
| 7 | | −142.239 | ASP | 0.200 | | | | |
| 8 | IR Cut Filter | Plano | | 0.600 | Glass | 1.517 | 64.2 | — |
| 9 | | Plano | | 0.240 | | | | |
| 10 | Image Surface | Plano | | — | | | | |

\* Reference wavelength is d-line 587.6 nm.

TABLE 12

| Aspheric Coefficients | | | |
|---|---|---|---|
| | Surface # | | |
| | 1 | 2 | 4 |
| k= | −9.0000E+01 | −7.7581E−01 | −5.1725E−01 |
| A4= | 8.2053E−02 | 1.1477E+00 | −1.9631E+00 |
| A6= | −3.0430E−02 | 1.0698E+01 | 2.9451E+01 |
| A8= | 7.5035E−03 | −7.3473E+01 | −1.8451E+03 |
| A10= | −9.0398E−04 | 3.1612E+02 | 3.2568E+04 |
| A12= | | | −1.5390E+05 |
| | Surface # | | |
| | 5 | 6 | 7 |
| k= | −6.9383E−01 | −3.2175E+00 | 2.0000E+01 |
| A4= | 1.9450E+01 | 2.3397E+01 | 9.5110E+00 |
| A6= | −2.4499E+02 | −4.2308E+02 | −1.0159E+02 |
| A8= | 2.3462E+03 | 4.1246E+03 | 5.9349E+02 |
| A10= | −1.3518E+04 | −2.3182E+04 | −1.8883E+03 |
| A12= | 3.5358E+04 | 5.4663E+04 | 2.5435E+03 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 0.70 | R4/CT2 | −0.47 |
| Fno. | 3.60 | |R5/R6| | 0.002 |
| HFOV [deg.] | 56.0 | f2/f1 | −0.39 |
| V2/V3 | 2.38 | f/f2 | 1.68 |
| CT2/CT1 | 0.46 | ΣAT/ΣCT | 0.44 |
| T12/CT1 | 0.62 | TL/f | 5.27 |
| T12/f | 1.00 | ImgH/f | 1.41 |
| (T12 + T23)/CT1 | 0.71 | SD/TD | 0.32 |
| (R3 − R4)/(R3 + R4) | 1.76 | Yp32/f | 0.01 |
| (R4 + R5)/(R4 − R5) | −5.79 | | |

7th Embodiment

Figure 7A:
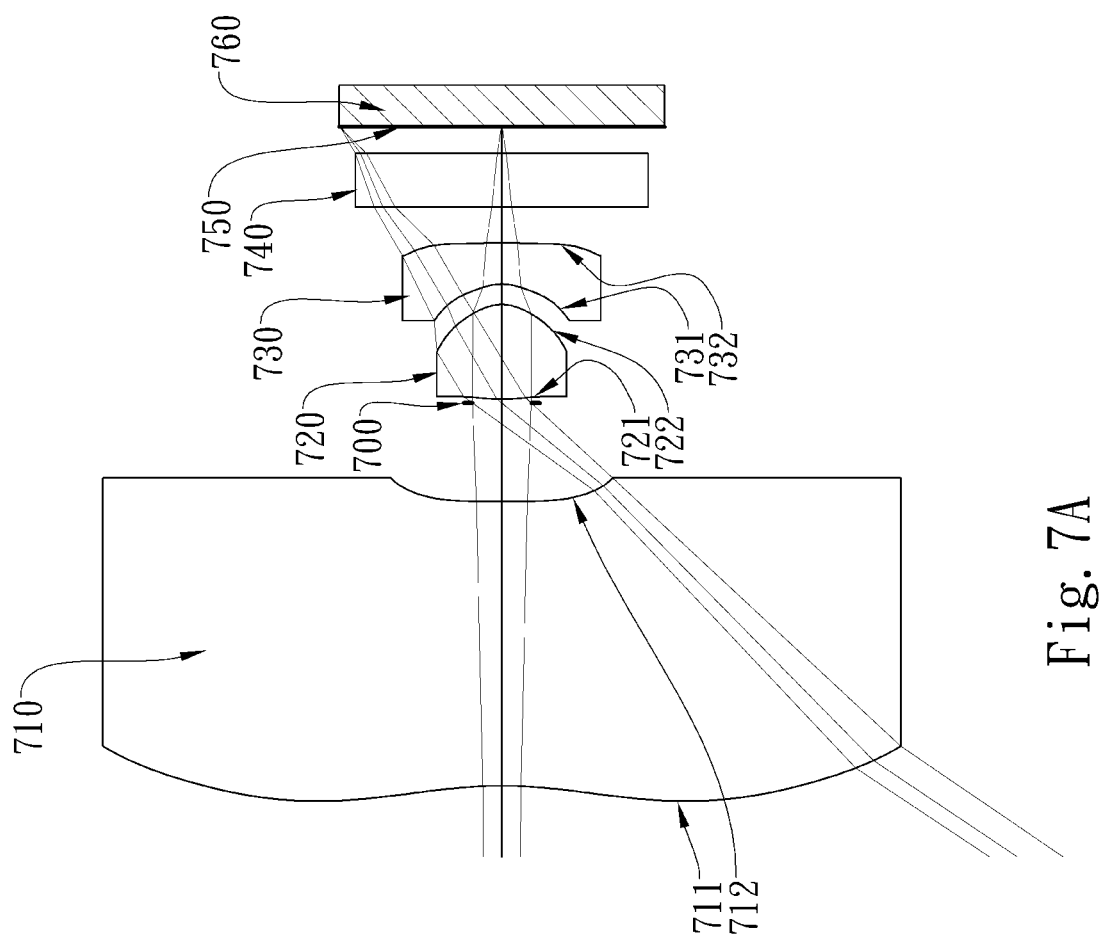
FIG. 7A is a schematic view of an imaging apparatus according to the 7th embodiment of the present disclosure.
Figure 7B:
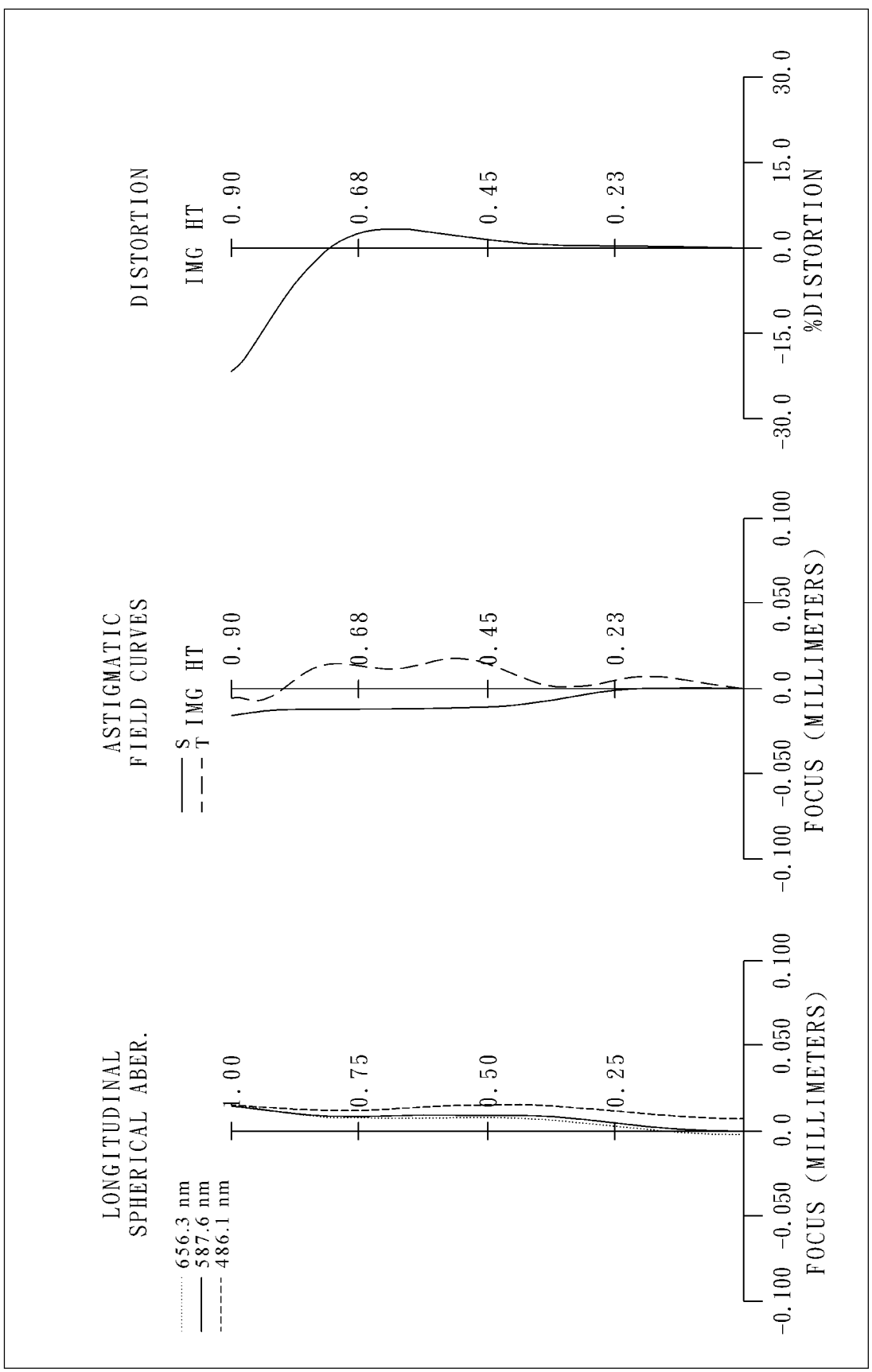
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes a micro imaging system (not otherwise herein labeled) of the present disclosure and an image sensor 760. The micro imaging system includes, in order from an object side to an image side, a first lens element 710, an aperture stop 700, a second lens element 720, and a third lens element 730.

The first lens element 710 with negative refractive power has an object-side surface 711 being concave in a paraxial region thereof, an image-side surface 712 being concave in a paraxial region thereof, both the object-side surface 711 and the image-side surface 712 being aspheric, and one inflection point on the object-side surface 711. The first lens element 710 is made of plastic material.

The second lens element 720 with positive refractive power has an object-side surface 721 being convex in a paraxial region thereof, an image-side surface 722 being convex in a paraxial region thereof, both the object-side surface 721 and the image-side surface 722 being aspheric, and one inflection point on the object-side surface 721. The second lens element 720 is made of plastic material.

The third lens element 730 with negative refractive power has an object-side surface 731 being concave in a paraxial region thereof, an image-side surface 732 being convex in a paraxial region thereof, both the object-side surface 731 and the image-side surface 732 being aspheric, one inflection point on the object-side surface 731 and three inflection points on the image-side surface 732. The third lens element 730 is made of plastic material.

The micro imaging system further includes an IR cut filter 740 located between the third lens element 730 and an image surface 750. The IR cut filter 740 is made of glass material and will not affect the focal length of the micro imaging system. The image sensor 760 is disposed on or near the image surface 750 of the micro imaging system.

The detailed optical data of the 7th embodiment are shown in TABLE 13, and the aspheric surface data are shown in TABLE 14, wherein the units of the curvature radius, the thickness and the focal length are expressed in mm, and HFOV is a half of the maximal field of view.

TABLE 13

(7th Embodiment)
f = 0.72 mm, Fno = 3.18, HFOV = 56.0 deg.

| Surface # | | Curvature Radius | | Thickness | Material | Index | Abbe # | Focal Length |
|---|---|---|---|---|---|---|---|---|
| 0 | Object | Plano | | 10.000 | | | | |
| 1 | Lens 1 | −2.399 | ASP | 1.594 | Plastic | 1.535 | 56.3 | −4.36 |
| 2 | | 104.373 | ASP | 0.552 | | | | |
| 3 | Ape. Stop | Plano | | 0.022 | | | | |
| 4 | Lens 2 | 1.093 | ASP | 0.530 | Plastic | 1.535 | 56.3 | 0.41 |
| 5 | | −0.230 | ASP | 0.114 | | | | |
| 6 | Lens 3 | −0.262 | ASP | 0.232 | Plastic | 1.671 | 19.5 | −0.50 |
| 7 | | −1.651 | ASP | 0.200 | | | | |
| 8 | IR Cut Filter | Plano | | 0.300 | Glass | 1.517 | 64.2 | — |
| 9 | | Plano | | 0.154 | | | | |
| 10 | Image Surface | Plano | | — | | | | |

* Reference wavelength is d-line 587.6 nm.

TABLE 14

| Aspheric Coefficients | | | |
|---|---|---|---|
| | Surface # | | |
| | 1 | 2 | 4 |
| k= | −1.5094E+01 | 2.0000E+01 | −1.1911E+01 |
| A4= | 7.6990E−02 | 8.2794E−01 | −2.8291E+00 |
| A6= | −1.8718E−02 | 1.4166E+00 | 1.2630E+02 |
| A8= | 2.0682E−03 | −9.3411E+00 | −5.2051E+03 |
| A10= | −6.5656E−05 | 1.5511E+01 | 6.6323E+04 |
| A12= | | | −2.5549E+05 |
| | Surface # | | |
| | 5 | 6 | 7 |
| k= | −6.9575E−01 | −1.4860E+00 | 6.3991E+00 |
| A4= | 1.5564E+01 | 2.2279E+01 | 6.0486E+00 |
| A6= | −1.4766E+02 | −3.8591E+02 | −5.7260E+01 |
| A8= | 9.9462E+02 | 3.3542E+03 | 2.6353E+02 |
| A10= | −3.5857E+03 | −1.7757E+04 | −6.4907E+02 |
| A12= | 5.4219E+03 | 4.1382E+04 | 6.8484E+02 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 0.72 | R4/CT2 | −0.43 |
| Fno. | 3.18 | |R5/R6| | 0.16 |
| HFOV [deg.] | 56.0 | f2/f1 | −0.09 |
| V2/V3 | 2.89 | f/f2 | 1.75 |
| CT2/CT1 | 0.33 | ΣAT/ΣCT | 0.29 |
| T12/CT1 | 0.36 | TL/f | 5.10 |
| T12/f | 0.79 | ImgH/f | 1.24 |
| (T12 + T23)/CT1 | 0.43 | SD/TD | 0.30 |
| (R3 − R4)/(R3 + R4) | 1.53 | Yp32/f | 0.14/0.32/0.72 |
| (R4 + R5)/(R4 − R5) | −15.46 | | |

8th Embodiment

FIG. 8A is a schematic view of an imaging apparatus according to the 8th embodiment of the present disclosure.

Figure 8B:
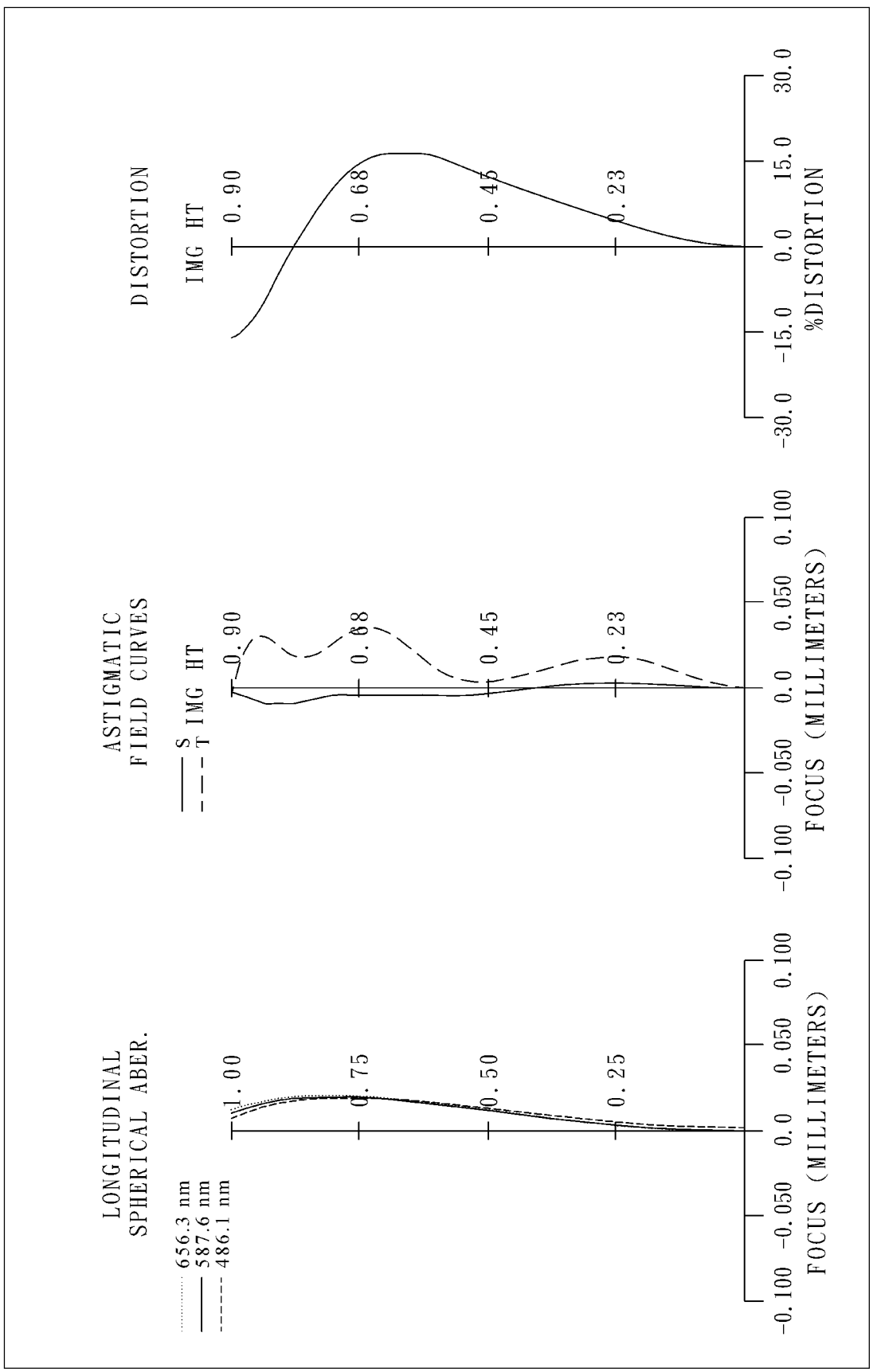
FIG. 8B shows longitudinal spherical aberration curves, astigmatic field curves and a distortion curve of the imaging apparatus according to the 8th embodiment.

FIG. 8B shows, in order from left to right, longitudinal spherical aberration curves, astigmatic field curves and a distortion curve of the imaging apparatus according to the 8th embodiment.

In FIG. 8A, the imaging apparatus includes a micro imaging system (not otherwise herein labeled) of the present disclosure and an image sensor 860. The micro imaging system includes, in order from an object side to an image side, a first lens element 810, an aperture stop 800, a second lens element 820, and a third lens element 830.

The first lens element 810 with positive refractive power has an object-side surface 811 being concave in a paraxial region thereof, an image-side surface 812 being convex in a paraxial region thereof, both the object-side surface 811 and the image-side surface 812 being aspheric, one inflection point on the object-side surface 811, and one inflection point on the image-side surface 812. The first lens element 810 is made of plastic material.

The second lens element 820 with positive refractive power has an object-side surface 821 being convex in a paraxial region thereof, an image-side surface 822 being convex in a paraxial region thereof, both the object-side surface 821 and the image-side surface 822 being aspheric, and one inflection point on the object-side surface 821. The second lens element 820 is made of plastic material.

The third lens element 830 with negative refractive power has an object-side surface 831 being concave in a paraxial region thereof, an image-side surface 832 being convex in a paraxial region thereof, both the object-side surface 831 and the image-side surface 832 being aspheric, one inflection point on the object-side surface 831 and three inflection points on the image-side surface 832. The third lens element 830 is made of plastic material.

The micro imaging system further includes an IR cut filter 840 located between the third lens element 830 and an image surface 850. The IR cut filter 840 is made of glass material and will not affect the focal length of the micro imaging system. The image sensor 860 is disposed on or near the image surface 850 of the micro imaging system.

The detailed optical data of the 8th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(8th Embodiment)
f = 0.64 mm, Fno = 2.76, HFOV = 57.0 deg.

| Surface # | | Curvature Radius | | Thickness | Material | Index | Abbe # | Focal Length |
|---|---|---|---|---|---|---|---|---|
| 0 | Object | Plano | | 10.000 | | | | |
| 1 | Lens 1 | −1.260 | ASP | 1.645 | Plastic | 1.534 | 55.9 | 10.92 |
| 2 | | −1.506 | ASP | 0.686 | | | | |
| 3 | Ape. Stop | Plano | | 0.020 | | | | |
| 4 | Lens 2 | 1.090 | ASP | 0.511 | Plastic | 1.544 | 56.0 | 0.40 |
| 5 | | −0.228 | ASP | 0.071 | | | | |
| 6 | Lens 3 | −0.257 | ASP | 0.200 | Plastic | 1.639 | 23.5 | −0.50 |
| 7 | | −1.711 | ASP | 0.200 | | | | |
| 8 | IR Cut Filter | Plano | | 0.300 | Glass | 1.517 | 64.2 | — |
| 9 | | Plano | | 0.117 | | | | |
| 10 | Image Surface | Plano | | — | | | | |

* Reference wavelength is d-line 587.6 nm.

TABLE 16

| Aspheric Coefficients | | | |
|---|---|---|---|
| Surface # | | | |
| | 1 | 2 | 4 |
| k= | −8.9858E+00 | −2.3224E+01 | −6.0319E+00 |
| A4= | 6.3348E−02 | 2.4219E−01 | −1.7447E+00 |
| A6= | −1.8573E−02 | −9.3895E−02 | 1.1304E+01 |
| A8= | 2.8706E−03 | 3.8686E−02 | −2.3356E+02 |
| A10= | −2.2077E−04 | −1.8527E−01 | −3.9178E+03 |
| A12= | 6.9965E−06 | 1.8539E−01 | 3.7261E+04 |
| Surface # | | | |
| | 5 | 6 | 7 |
| k= | −7.4618E−01 | −1.4085E+00 | 7.7767E+00 |
| A4= | 1.7655E+01 | 2.0282E+01 | 5.8881E+00 |
| A6= | −1.9245E+02 | −3.2840E+02 | −6.0670E+01 |
| A8= | 1.2620E+03 | 1.8996E+03 | 2.7881E+02 |
| A10= | −3.9123E+03 | −4.6843E+03 | −6.6790E+02 |
| A12= | 2.6279E+03 | 4.9005E+03 | 7.2639E+02 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 0.64 | R4/CT2 | −0.45 |
| Fno. | 2.76 | |R5/R6| | 0.15 |
| HFOV [deg.] | 57.0 | f2/f1 | 0.04 |
| V2/V3 | 2.38 | f/f2 | 1.59 |
| CT2/CT1 | 0.31 | ΣAT/ΣCT | 0.33 |
| T12/CT1 | 0.43 | TL/f | 5.86 |
| T12/f | 1.10 | ImgH/f | 1.41 |
| (T12 + T23)/CT1 | 0.47 | SD/TD | 0.26 |
| (R3 − R4)/(R3 + R4) | 1.53 | Yp32/f | 0.17/0.31/0.73 |
| (R4 + R5)/(R4 − R5) | −16.44 | | |

9th Embodiment

Figure 9A:
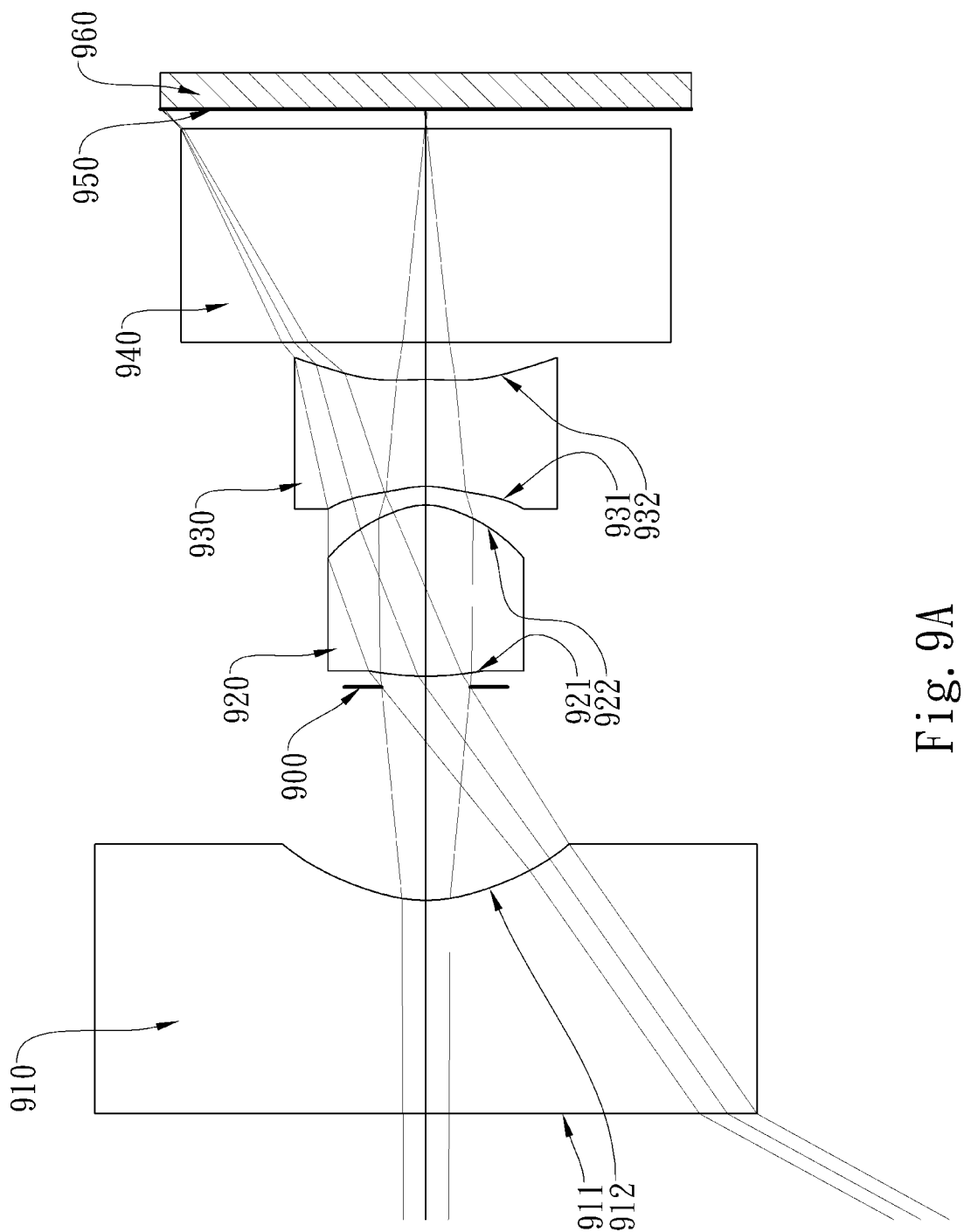
FIG. 9A is a schematic view of an imaging apparatus according to the 9th embodiment of the present disclosure.
Figure 9B:
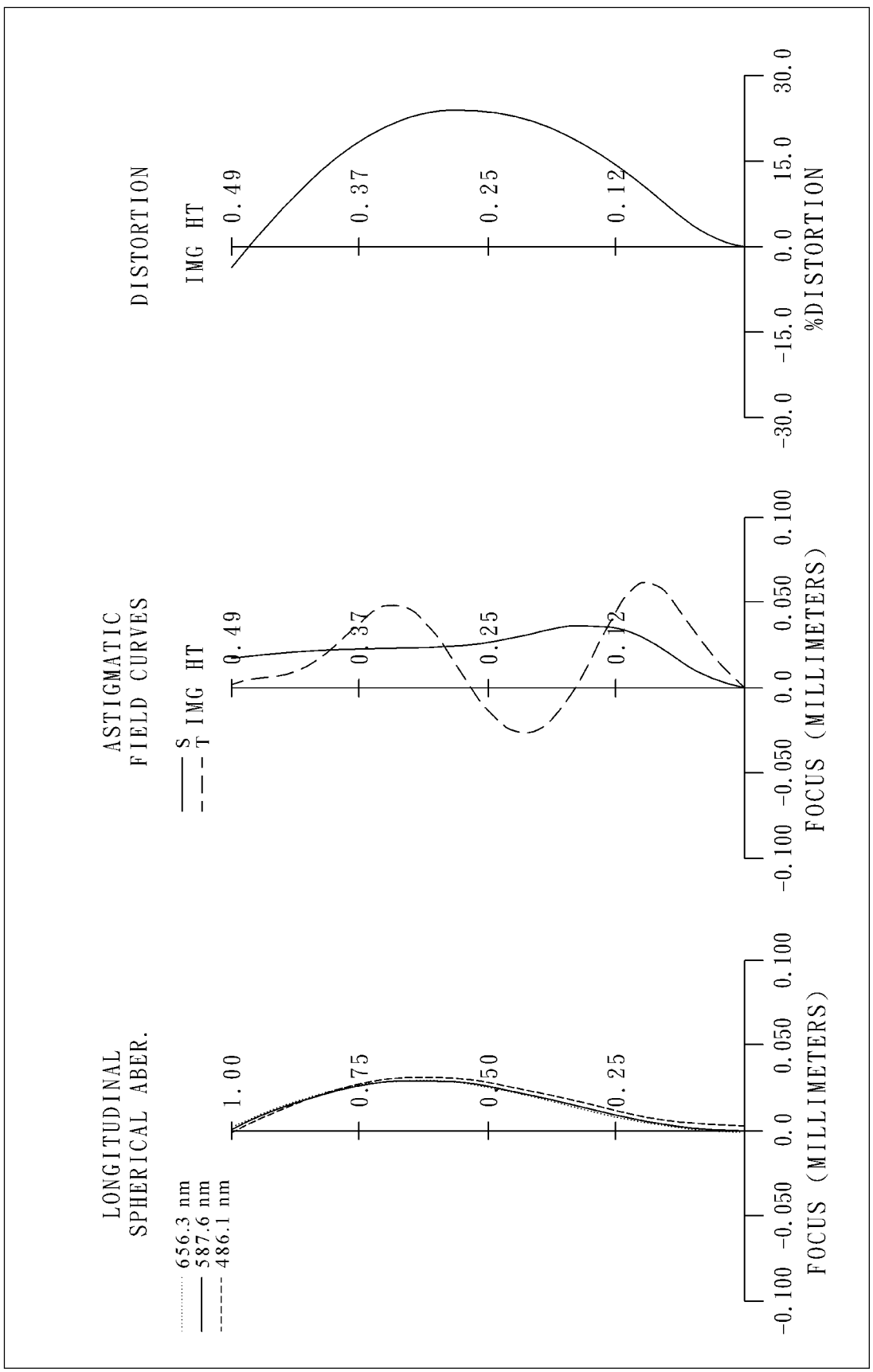
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes a micro imaging system (not otherwise herein labeled) of the present disclosure and an image sensor 960. The micro imaging system includes, in order from an object side to an image side, a first lens element 910, an aperture stop 900, a second lens element 920, and a third lens element 930.

The first lens element 910 with negative refractive power has an object-side surface 911 being planar, an image-side surface 912 being concave in a paraxial region thereof, and the image-side surface 912 being aspheric. The first lens element 910 is made of plastic material.

The second lens element 920 with positive refractive power has an object-side surface 921 being convex in a paraxial region thereof, an image-side surface 922 being convex in a paraxial region thereof, and both the object-side surface 921 and the image-side surface 922 being aspheric. The second lens element 920 is made of plastic material.

The third lens element 930 with negative refractive power has an object-side surface 931 being concave in a paraxial region thereof, an image-side surface 932 being convex in a paraxial region thereof, both the object-side surface 931 and the image-side surface 932 being aspheric, two inflection points on the object-side surface 931 and one inflection point on the image-side surface 932. The third lens element 930 is made of plastic material.

The micro imaging system further includes an IR cut filter 940 located between the third lens element 930 and an image surface 950. The IR cut filter 940 is made of glass material and will not affect the focal length of the micro imaging system. The image sensor 960 is disposed on or near the image surface 950 of the micro imaging system.

The detailed optical data of the 9th embodiment are shown in TABLE 17, and the aspheric surface data are shown in TABLE 18, wherein the units of the curvature radius, the thickness and the focal length are expressed in mm, and HFOV is a half of the maximal field of view.

TABLE 17

(9th Embodiment)
f = 0.28 mm, Fno = 3.00, HFOV = 61.0 deg.

| Surface # | | Curvature Radius | | Thickness | Material | Index | Abbe # | Focal Length |
|---|---|---|---|---|---|---|---|---|
| 0 | Object | Plano | | 5.000 | | | | |
| 1 | Lens 1 | Plano | | 0.400 | Plastic | 1.534 | 55.9 | −0.50 |
| 2 | | 0.266 | ASP | 0.400 | | | | |
| 3 | Ape. Stop | Plano | | 0.020 | | | | |
| 4 | Lens 2 | 0.483 | ASP | 0.321 | Plastic | 1.544 | 56.0 | 0.22 |
| 5 | | −0.121 | ASP | 0.035 | | | | |
| 6 | Lens 3 | −0.175 | ASP | 0.200 | Plastic | 1.639 | 23.5 | −0.40 |
| 7 | | −0.830 | ASP | 0.070 | | | | |
| 8 | IR Cut Filter | Plano | | 0.400 | Glass | 1.517 | 64.2 | — |
| 9 | | Plano | | 0.039 | | | | |
| 10 | Image Surface | Plano | | — | | | | |

* Reference wavelength is d-line 587.6 nm.

TABLE 18

Aspheric Coefficients

| | Surface # | | | | |
|---|---|---|---|---|---|
| | 2 | 4 | 5 | 6 | 7 |
| k= | −1.0341E+00 | −1.7418E+00 | −6.8505E−01 | −3.3433E+00 | 2.9453E+00 |
| A4= | −2.0081E+01 | −3.1010E+01 | 2.0285E+02 | 2.0130E+02 | 1.0244E+02 |
| A6= | 3.4982E+02 | 4.7587E+03 | −1.1238E+04 | −1.4388E+04 | −3.4280E+03 |
| A8= | −2.6991E+03 | −4.9512E+05 | 3.9583E+05 | 4.9470E+05 | 6.1242E+04 |
| A10= | 8.8056E+03 | 2.1794E+07 | −7.2051E+06 | −9.0386E+06 | −5.6818E+05 |
| A12= | | −2.9620E+08 | 5.8506E+07 | 6.8913E+07 | 2.1651E+06 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 0.28 | R4/CT2 | −0.38 |
| Fno. | 3.00 | |R5/R6| | 0.21 |
| HFOV [deg.] | 61.0 | f2/f1 | −0.44 |
| V2/V3 | 2.38 | f/f2 | 1.26 |
| CT2/CT1 | 0.80 | ΣAT/ΣCT | 0.49 |
| T12/CT1 | 1.05 | TL/f | 6.83 |
| T12/f | 1.52 | ImgH/f | 1.79 |
| (T12 + T23)/CT1 | 1.14 | SD/TD | 0.42 |
| (R3 − R4)/(R3 + R4) | 1.67 | Yp32/f | 0.11 |
| (R4 + R5)/(R4 − R5) | −5.45 | | |

10th Embodiment

Figure 10A:
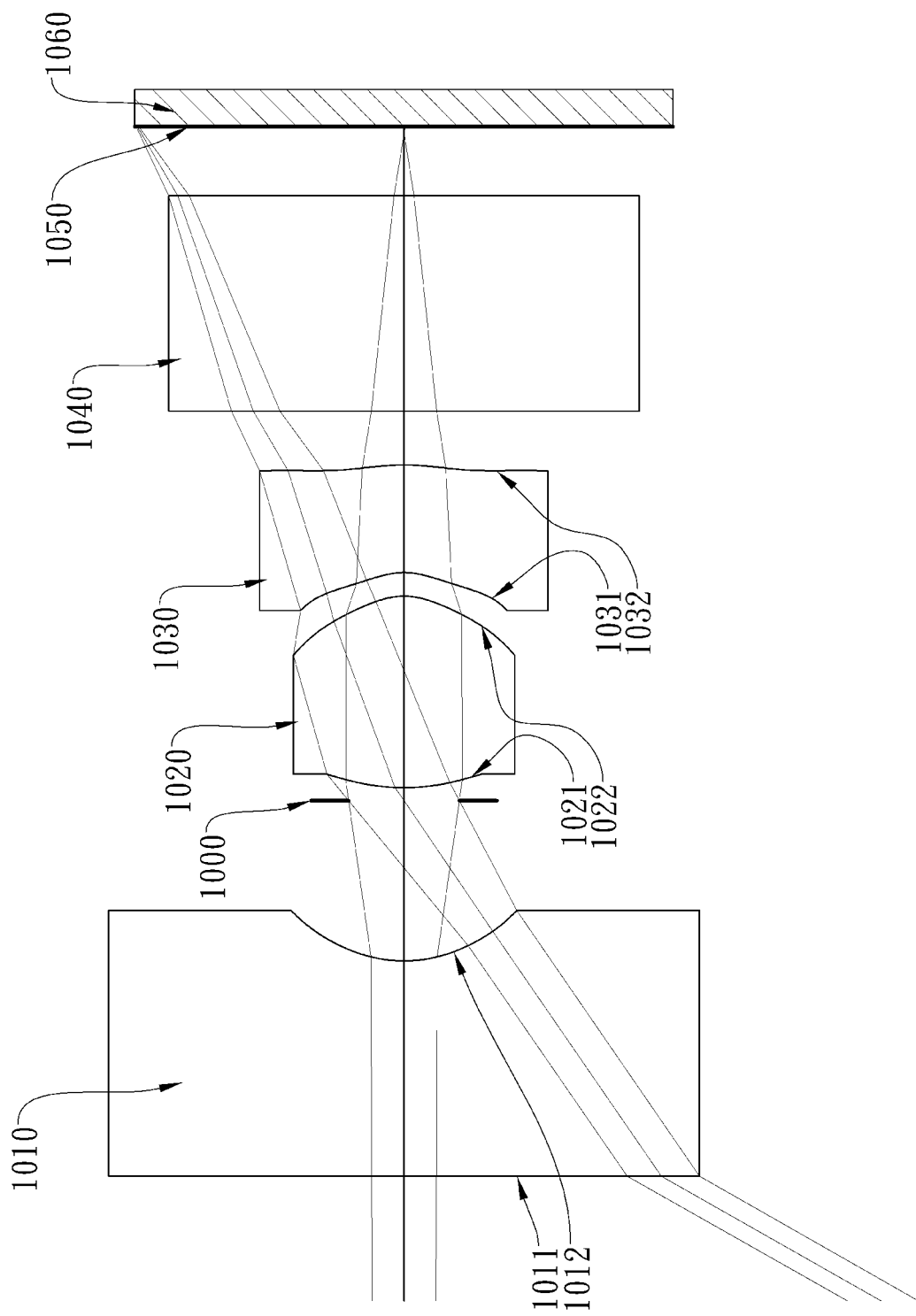
FIG. 10A is a schematic view of an imaging apparatus according to the 10th embodiment of the present disclosure.
Figure 10B:
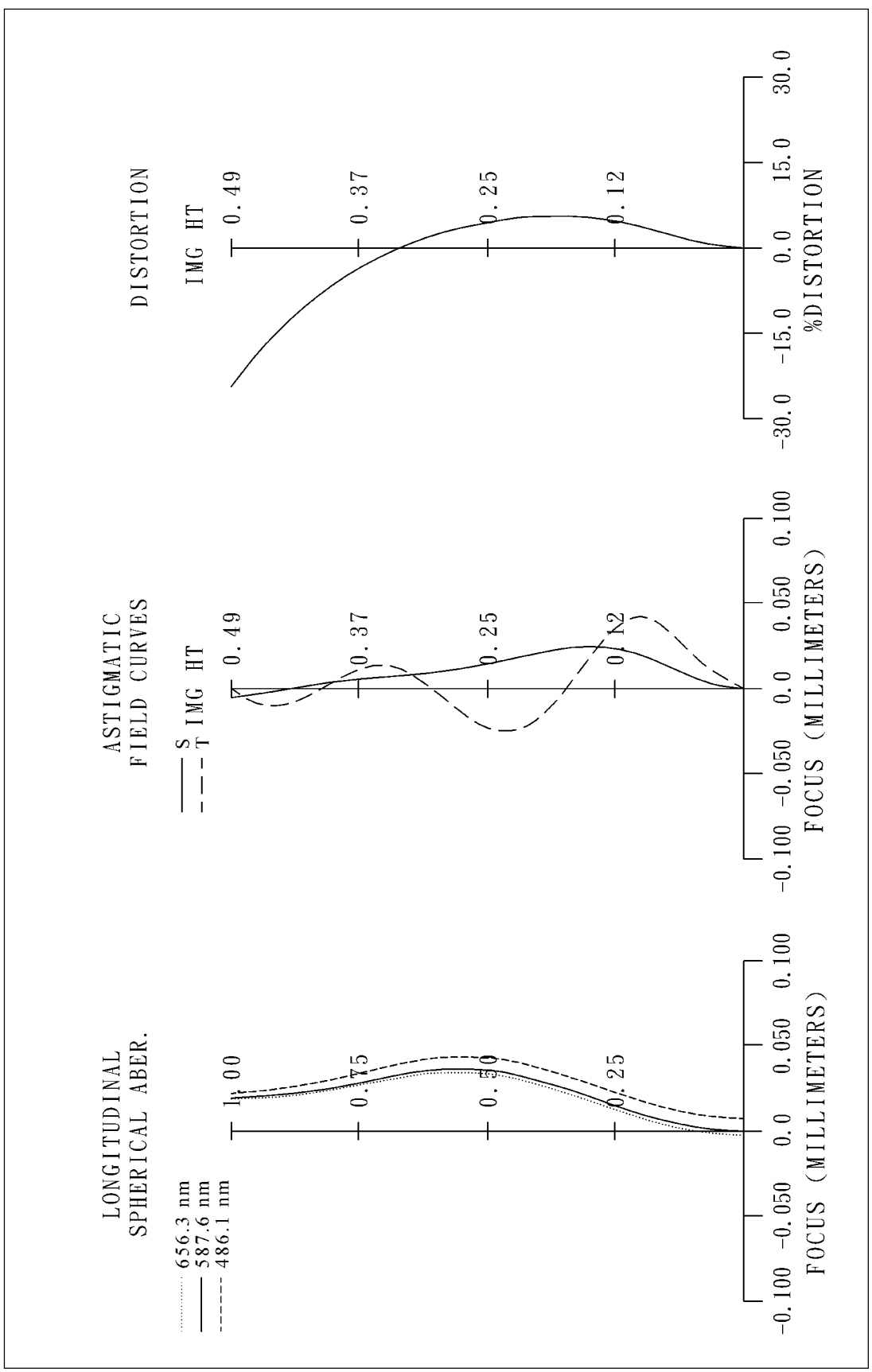
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes a micro imaging system (not otherwise herein labeled) of the present disclosure and an image sensor 1060. The micro imaging system includes, in order from an object side to an image side, a first lens element 1010, an aperture stop 1000, a second lens element 1020, and a third lens element 1030.

The first lens element 1010 with negative refractive power has an object-side surface 1011 being planar, an image-side surface 1012 being concave in a paraxial region thereof, and the image-side surface 1012 being aspheric. The first lens element 1010 is made of plastic material.

The second lens element 1020 with positive refractive power has an object-side surface 1021 being convex in a paraxial region thereof, an image-side surface 1022 being convex in a paraxial region thereof, and both the object-side surface 1021 and the image-side surface 1022 being aspheric. The second lens element 1020 is made of plastic material.

The third lens element 1030 with negative refractive power has an object-side surface 1031 being concave in a paraxial region thereof, an image-side surface 1032 being convex in a paraxial region thereof, both the object-side surface 1031 and the image-side surface 1032 being aspheric, two inflection points on the object-side surface 1031 and two inflection points on the image-side surface 1032. The third lens element 1030 is made of plastic material.

The micro imaging system further includes an IR cut filter 1040 located between the third lens element 1030 and an image surface 1050. The IR cut filter 1040 is made of glass material and will not affect the focal length of the micro imaging system. The image sensor 1060 is disposed on or near the image surface 1050 of the micro imaging system.

The detailed optical data of the 10th embodiment are shown in TABLE 19 and the aspheric surface data are shown in TABLE 20 wherein the units of the curvature radius, the thickness and the focal length are expressed in mm, and HFOV is a half of the maximal field of view.

TABLE 19

(10th Embodiment)
f = 0.37 mm, Fno = 3.00, HFOV = 60.4 deg.

| Surface # | | Curvature Radius | | Thickness | Material | Index | Abbe # | Focal Length |
|---|---|---|---|---|---|---|---|---|
| 0 | Object | Plano | | 10.000 | | | | |
| 1 | Lens 1 | Plano | | 0.400 | Plastic | 1.534 | 55.9 | −0.45 |
| 2 | | 0.240 | ASP | 0.298 | | | | |
| 3 | Ape. Stop | Plano | | 0.024 | | | | |
| 4 | Lens 2 | 0.359 | ASP | 0.356 | Plastic | 1.544 | 56.0 | 0.23 |
| 5 | | −0.126 | ASP | 0.044 | | | | |
| 6 | Lens 3 | −0.130 | ASP | 0.200 | Plastic | 1.660 | 20.4 | −0.40 |
| 7 | | −0.410 | ASP | 0.100 | | | | |
| 8 | IR Cut Filter | Plano | | 0.400 | Glass | 1.517 | 64.2 | — |
| 9 | | Plano | | 0.129 | | | | |
| 10 | Image Surface | Plano | | — | | | | |

* Reference wavelength is d-line 587.6 nm.

TABLE 20

Aspheric Coefficients

| | Surface # | | | | |
|---|---|---|---|---|---|
| | 2 | 4 | 5 | 6 | 7 |
| k= | −2.6536E−01 | −1.7282E+00 | −7.2453E−01 | −9.9144E−01 | −1.2775E−03 |
| A4= | −1.7201E+01 | −2.4120E+01 | 1.5270E+02 | 2.3351E+02 | 5.3166E+01 |
| A6= | 5.0122E+02 | 4.4562E+03 | −5.4381E+03 | −1.1926E+04 | −1.0716E+03 |
| A8= | −1.0480E+04 | −3.9954E+05 | 1.3695E+05 | 3.8099E+05 | 1.2667E+04 |

TABLE 20-continued

Aspheric Coefficients

| Surface # | 2 | 4 | 5 | 6 | 7 |
|---|---|---|---|---|---|
| A10= | 8.5861E+04 | 1.5499E+07 | −2.0468E+06 | −7.3395E+06 | −8.2485E+04 |
| A12= | | −2.2150E+08 | 1.5176E+07 | 6.0317E+07 | 1.9962E+05 |
| A14= | | | | −3.4959E+07 | 3.6702E+05 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 0.37 | R4/CT2 | −0.36 |
| Fno. | 3.00 | \|R5/R6\| | 0.32 |
| HFOV [deg.] | 60.4 | f2/f1 | −0.51 |
| V2/V3 | 2.74 | f/f2 | 1.60 |
| CT2/CT1 | 0.89 | ΣAT/ΣCT | 0.38 |
| T12/CT1 | 0.81 | TL/f | 5.28 |
| T12/f | 0.87 | ImgH/f | 1.34 |
| (T12 + T23)/CT1 | 0.92 | SD/TD | 0.47 |
| (R3 − R4)/(R3 + R4) | 2.09 | Yp32/f | 0.19/0.51 |
| (R4 + R5)/(R4 − R5) | −77.19 | | |

11th Embodiment

Figure 11A:
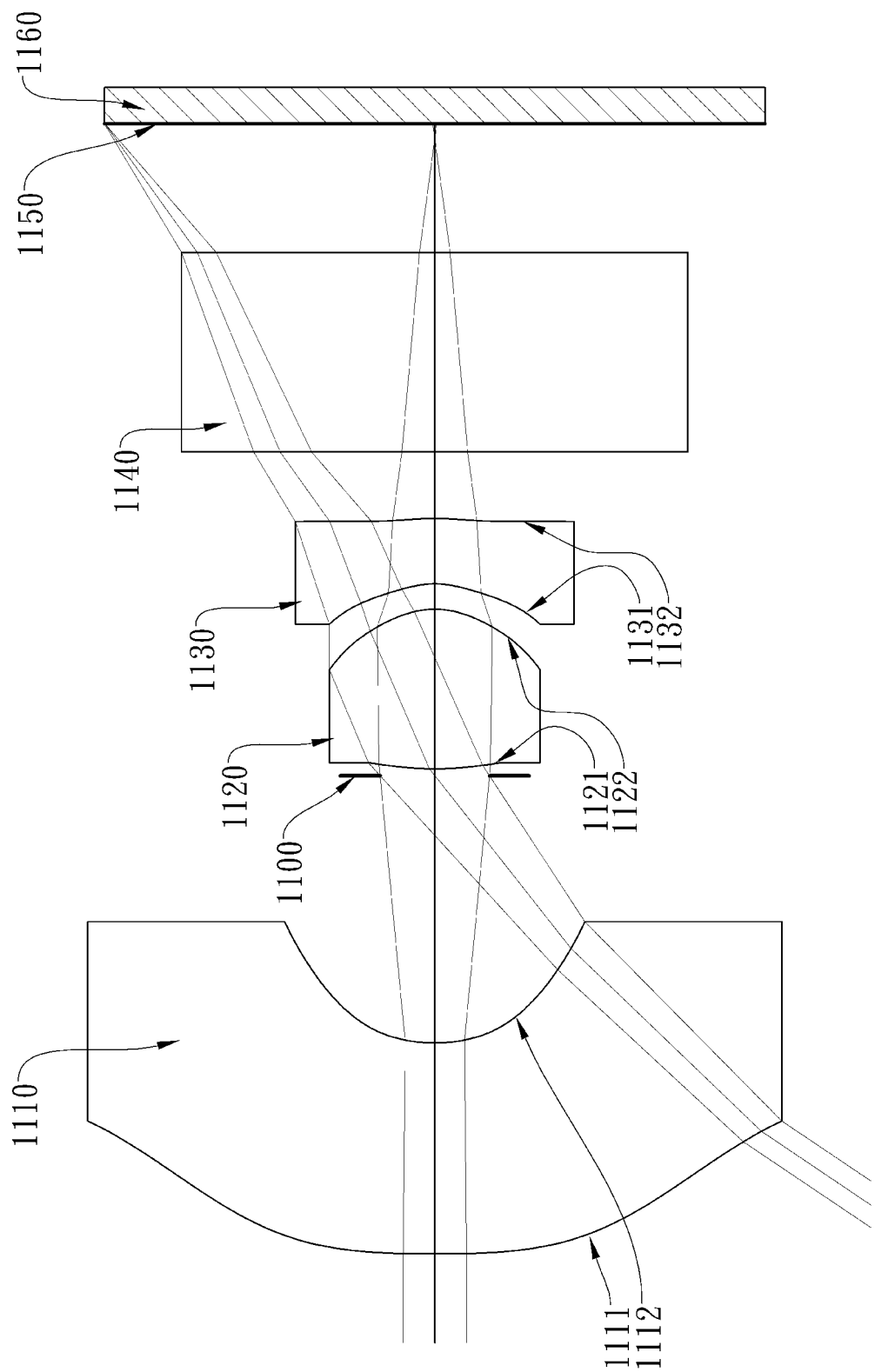
FIG. 11A is a schematic view of an imaging apparatus according to the 11th embodiment of the present disclosure.
Figure 11B:
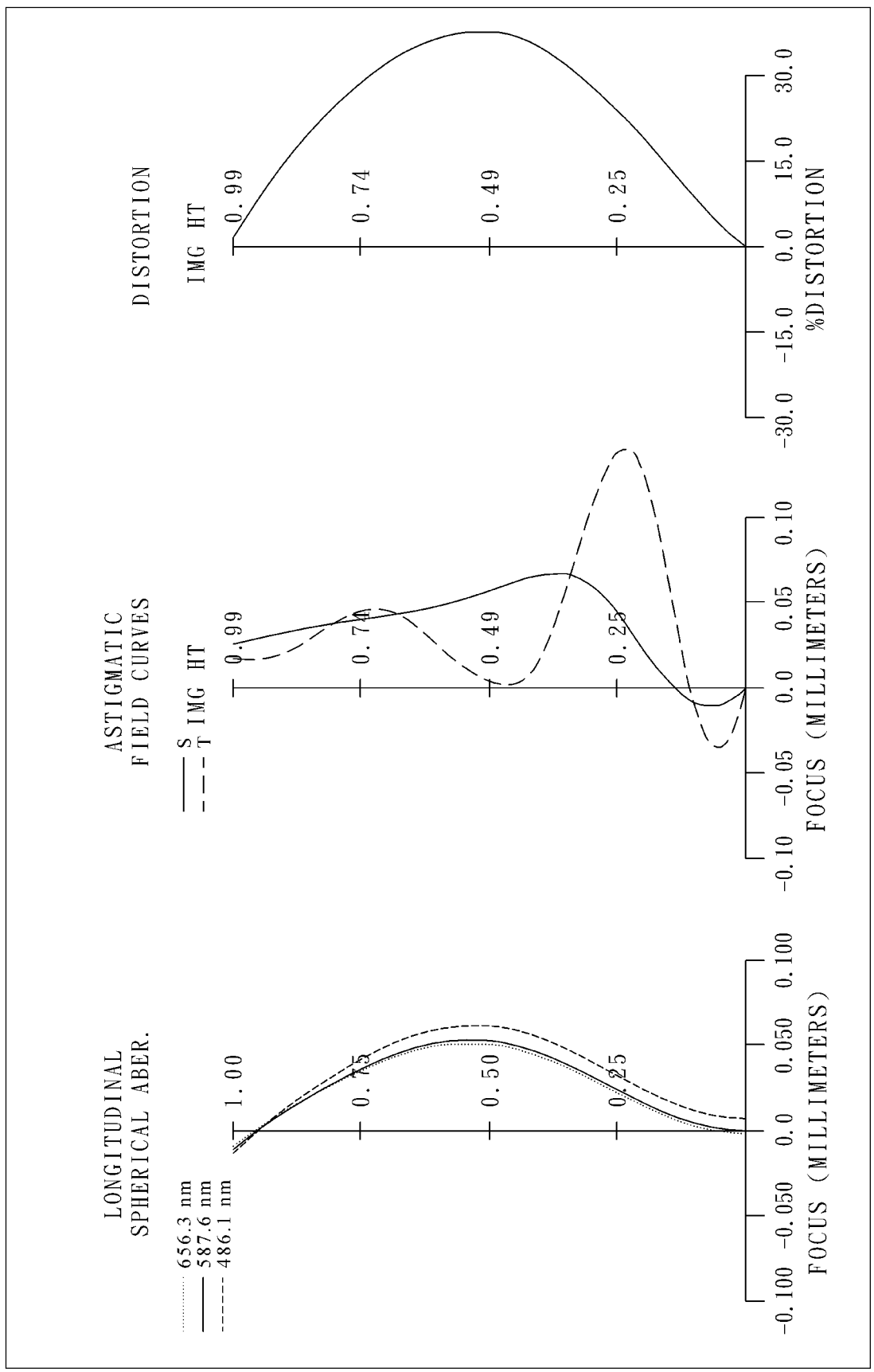
FIG. 11B shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B shows, in order from left to right, longitudinal spherical aberration curves, astigmatic field curves and a distortion curve of the imaging apparatus according to the 11th embodiment.

In FIG. 11A, the imaging apparatus includes a micro imaging system (not otherwise herein labeled) of the present disclosure and an image sensor 1160. The micro imaging system includes, in order from an object side to an image side, a first lens element 1110, an aperture stop 1100, a second lens element 1120, and a third lens element 1130.

The first lens element 1110 with negative refractive power has an object-side surface 1111 being convex in a paraxial region thereof, an image-side surface 1112 being concave in a paraxial region thereof, both the object-side surface 1111 and the image-side surface 1112 being aspheric, and one inflection point on the object-side surface 1111. The first lens element 1110 is made of plastic material.

The second lens element 1120 with positive refractive power has an object-side surface 1121 being convex in a paraxial region thereof, an image-side surface 1122 being convex in a paraxial region thereof, both the object-side surface 1121 and the image-side surface 1122 being aspheric, and one inflection point on the object-side surface 1121. The second lens element 1120 is made of plastic material.

The third lens element 1130 with negative refractive power has an object-side surface 1131 being concave in a paraxial region thereof, an image-side surface 1132 being convex in a paraxial region thereof, both the object-side surface 1131 and the image-side surface 1132 being aspheric, and three inflection points on the image-side surface 1132. The third lens element 1130 is made of plastic material.

The micro imaging system further includes an IR cut filter 1140 located between the third lens element 1130 and an image surface 1150. The IR cut filter 1140 is made of glass material and will not affect the focal length of the micro imaging system. The image sensor 1160 is disposed on or near the image surface 1150 of the micro imaging system.

The detailed optical data of the 11th embodiment are shown in TABLE 21 and the aspheric surface data are shown in TABLE 22 wherein the units of the curvature radius, the thickness and the focal length are expressed in mm, and HFOV is a half of the maximal field of view.

TABLE 21

(11th Embodiment)
f = 0.64 mm, Fno = 3.38, HFOV = 56.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.546 | ASP | 0.634 | Plastic | 1.534 | 55.9 | −0.92 |
| 2 | | 0.423 | ASP | 0.804 | | | | |
| 3 | Ape. Stop | Plano | | 0.020 | | | | |
| 4 | Lens 2 | 0.892 | ASP | 0.480 | Plastic | 1.534 | 55.9 | 0.41 |
| 5 | | −0.238 | ASP | 0.076 | | | | |
| 6 | Lens 3 | −0.256 | ASP | 0.196 | Plastic | 1.639 | 23.3 | −0.70 |
| 7 | | −0.779 | ASP | 0.200 | | | | |
| 8 | IR Cut Filter | Plano | | 0.600 | Glass | 1.517 | 64.2 | — |
| 9 | | Plano | | 0.387 | | | | |
| 10 | Image Surface | Plano | | — | | | | |

* Reference wavelength is d-line 587.6 nm.

TABLE 22

Aspheric Coefficients

| | Surface # | | |
|---|---|---|---|
| | 1 | 2 | 4 |
| k= | 4.0704E+00 | −2.1034E+01 | −6.0611E+00 |
| A4= | 1.0375E+00 | 1.6735E+01 | −1.1878E+00 |
| A6= | −1.2738E+00 | −9.8059E+01 | 2.9237E+01 |
| A8= | 6.0625E−01 | 3.2992E+02 | −2.0488E+03 |
| A10= | −1.0896E−01 | −4.2776E+02 | 2.5675E+04 |
| A12= | | | −8.3878E+04 |

| | Surface # | | |
|---|---|---|---|
| | 5 | 6 | 7 |
| k= | −6.7300E−01 | −1.7466E+00 | −6.4938E+01 |
| A4= | 2.2165E+01 | 3.3926E+01 | 7.5164E+00 |
| A6= | −3.9970E+02 | −8.2688E+02 | −1.0510E+02 |
| A8= | 5.0186E+03 | 1.0423E+04 | 7.2821E+02 |
| A10= | −3.5603E+04 | −7.2642E+04 | −2.6080E+03 |
| A12= | 1.0498E+05 | 2.0943E+05 | 3.8538E+03 |

In the 11th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 11th embodiment, so an explanation in this regard will not be provided again.

Moreover, these parameters can be calculated from TABLE 21 and TABLE 22 and satisfy the conditions stated in table below.

| 11th Embodiment | | | |
|---|---|---|---|
| f [mm] | 0.64 | R4/CT2 | −0.49 |
| Fno. | 3.38 | |R5/R6| | 0.33 |
| HFOV [deg.] | 56.1 | f2/f1 | −0.45 |
| V2/V3 | 2.40 | f/f2 | 1.55 |
| CT2/CT1 | 0.76 | ΣAT/ΣCT | 0.69 |
| T12/CT1 | 1.30 | TL/f | 5.31 |
| T12/f | 1.29 | ImgH/f | 1.55 |
| (T12 + T23)/CT1 | 1.42 | SD/TD | 0.35 |
| (R3 − R4)/(R3 + R4) | 1.73 | Yp32/f | 0.13/0.41/0.59 |
| (R4 + R5)/(R4 − R5) | −27.30 | | |

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A micro imaging system, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has negative refractive power, the object-side surface of the first lens element is concave in a paraxial region thereof and has at least one convex surface in an off-axial region thereof; the second lens element has positive refractive power, the object-side surface of the second lens element is convex in a paraxial region thereof, and the image-side surface of the second lens element is convex in a paraxial region thereof, at least one of the object-side and image-side surfaces of the third lens element is aspheric;

wherein the micro imaging system has a total of three lens elements, an axial distance between the object-side surface of the first lens element and an image surface is TL, a focal length of the micro imaging system is f, a maximum image height of the micro imaging system is ImgH, and the following conditions are satisfied:

$3.80 < TL/f < 10.0$; and $0.95 < ImgH/f < 3.0$.

2. The micro imaging system of claim 1, wherein the third lens element has both the object-side surface and the image-side surface being aspheric, and the first lens element has the image-side surface being concave in a paraxial region thereof.

3. The micro imaging system of claim 1, wherein there is at least one inflection point on at least one surface of the third lens element.

4. The micro imaging system of claim 1, further comprising an aperture stop disposed between the first lens element and the second lens element.

5. The micro imaging system of claim 1, wherein the focal length of the micro imaging system is f, the maximum image height of the micro imaging system is ImgH, and the following condition is satisfied:

$1.9 \leq ImgH/f < 3.0$.

6. The micro imaging system of claim 1, wherein an axial distance between the first lens element and the second lens element is T12, a central thickness of the first lens element is CT1, and the following condition is satisfied:

$0.30 < T12/CT1 < 2.50$.

7. The micro imaging system of claim 1, wherein a sum of all axial distances between adjacent lens elements of the micro imaging system is ΣAT, a sum of central thicknesses of the first lens element, the second lens element, and the third lens element is ΣCT, and the following condition is satisfied:

$0.20 < ΣAT/ΣCT < 0.95$.

8. The micro imaging system of claim 1, wherein an axial distance between the first lens element and the second lens element is T12, the focal length of the micro imaging system is f, and the following condition is satisfied:

$0.60 < T12/f < 3.5$.

9. The micro imaging system of claim 1, wherein an absolute value of a curvature radius of the object-side surface of the third lens element is smaller than an absolute value of a curvature radius of the image-side surface of the third lens element.

10. An imaging apparatus, comprising the micro imaging system of claim 1 and an image sensor disposed on an image surface of the micro imaging system.

11. An electronic device, comprising the imaging apparatus of claim 10.

12. A micro imaging system, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has negative refractive power, the object-side surface of the first lens element is concave in a paraxial region thereof and has at least one convex surface in an off-axial region thereof; the second lens element has positive refractive power;

wherein the micro imaging system has a total of three lens elements, an axial distance between the object-side surface of the first lens element and an image surface is TL, a focal length of the micro imaging system is f, a maximum image height of the micro imaging system is ImgH, a curvature radius of the object-side surface of the third lens element is R5, a curvature radius of the image-side surface of the third lens element is R6, and the following conditions are satisfied:

$3.80 < TL/f < 10.0$;

$0.95 < ImgH/f < 3.0$; and $|R5/R6| < 0.70$.

13. The micro imaging system of claim 12, wherein the image-side surface of the first lens element is concave in a paraxial region thereof, the focal length of the micro imaging system is f, a focal length of the second lens element is f2, and the following condition is satisfied:

$0 < f/f2 \leq 1.09$.

14. The micro imaging system of claim 12, wherein a sum of all axial distances between adjacent lens elements of the micro imaging system is ΣAT, a sum of central thicknesses of the first lens element, the second lens element, and the third lens element is ΣCT, and the following condition is satisfied:

$0.20 < \Sigma AT/\Sigma CT \leq 0.51$.

15. The micro imaging system of claim 12, wherein a curvature radius of the object-side surface of the second lens element is R3, a curvature radius of the image-side surface of the second lens element is R4, the focal length of the micro imaging system is f, the maximum image height of the micro imaging system is ImgH, and the following conditions are satisfied:

$0 < (R3-R4)/(R3+R4) < 3.0$; and $1.19 \leq ImgH/f < 3.0$.

16. The micro imaging system of claim 12, wherein an absolute value of a curvature radius of the object-side surface of the second lens element is smaller than an absolute value of a curvature radius of the image-side surface of the third lens element.

17. A micro imaging system, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has negative refractive power, the object-side surface of the first lens element is concave in a paraxial region thereof and has at least one convex surface in an off-axial region thereof; the second lens element has positive refractive power, the image-side surface of the second lens element is convex in a paraxial region thereof;

wherein the micro imaging system has a total of three lens elements, an axial distance between the object-side surface of the first lens element and an image surface is TL, a focal length of the micro imaging system is f, a curvature radius of the object-side surface of the third lens element is R5, a curvature radius of the image-side surface of the third lens element is R6, an axial distance between the first lens element and the second lens element is T12, an axial distance between the second lens element and the third lens element is T23, a central thickness of the first lens element is CT1, and the following conditions are satisfied:

$3.80 < TL/f < 10.0$;

$|R5/R6| < 0.70$; and $0.10 < (T12+T23)/CT1 < 2.15$.

18. The micro imaging system of claim 17, further comprising an aperture stop disposed between the first lens element and the second lens element.

19. The micro imaging system of claim 17, wherein the curvature radius of the object-side surface of the third lens element is R5, the curvature radius of the image-side surface of the third lens element is R6, and the following condition is satisfied:

$|R5/R6| < 0.50$.

20. The micro imaging system of claim 17, wherein the axial distance between the first lens element and the second lens element is T12, the axial distance between the second lens element and the third lens element is T23, the central thickness of the first lens element is CT1, and the following condition is satisfied:

$0.30 < (T12+T23)/CT1 < 1.50$.

21. The micro imaging system of claim 17, wherein the central thickness of the first lens element is CT1, a central thickness of the second lens element is CT2, and the following condition is satisfied:

$0.10 < CT2/CT1 < 1.80$.

22. The micro imaging system of claim 17, wherein an absolute value of a curvature radius of the object-side surface of the first lens element is smaller than an absolute value of a curvature radius of the image-side surface of the first lens element.

23. A micro imaging system, comprising three lens elements, the three lens elements being, in order from an object side to an image side: a first lens element, a second lens element and a third lens element; each of the three lens elements comprising an object-side surface facing toward the object side and an image-side surface facing toward the image side;

wherein the first lens element has negative refractive power, the object-side surface of the first lens element is concave in a paraxial region thereof and has at least one convex surface in an off-axial region thereof; the second lens element has positive refractive power, the image-side surface of the third lens element is concave in a paraxial region thereof;

wherein the micro imaging system has a total of three lens elements, an axial distance between the object-side surface of the first lens element and an image surface is TL, a focal length of the micro imaging system is f, an axial distance between the first lens element and the second lens element is T12, an axial distance between the second lens element and the third lens element is T23, a central thickness of the first lens element is CT1, and the following conditions are satisfied:

$3.80 < TL/f < 10.0$; and $0.10 < (T12+T23)/CT1 < 2.15$.

24. The micro imaging system of claim 23, wherein the axial distance between the first lens element and the second lens element is T12, the axial distance between the second lens element and the third lens element is T23, the central thickness of the first lens element is CT1, and the following condition is satisfied:

$0.30 < (T12+T23)/CT1 < 1.50$.

25. The micro imaging system of claim 23, wherein a sum of all axial distances between adjacent lens elements of the micro imaging system is ΣAT, a sum of central thicknesses of the first lens element, the second lens element, and the third lens element is ΣCT, and the following condition is satisfied:

$0.20 < \Sigma AT/\Sigma CT \leq 0.51$.

26. The micro imaging system of claim 23, wherein the axial distance between the first lens element and the second lens element is larger than a central thickness of the third lens element.

* * * * *